(12) United States Patent
Noguchi et al.

(10) Patent No.: US 10,276,137 B2
(45) Date of Patent: Apr. 30, 2019

(54) ELECTRONIC MUSICAL SCORE APPARATUS

(71) Applicants: Terrada Music Score Co., Ltd., Tokyo (JP); VAIO Corporation, Nagano (JP)

(72) Inventors: Fujio Noguchi, Tokyo (JP); Junichi Tadano, Azumino (JP); Shuhei Nakada, Azumino (JP)

(73) Assignee: GVIDO MUSIC CO., LTD., Tokyo (JP)

( * ) Notice: Subject to any disclaimer, the term of this patent is extended or adjusted under 35 U.S.C. 154(b) by 0 days.

(21) Appl. No.: 15/943,678

(22) Filed: Apr. 2, 2018

(65) Prior Publication Data

US 2018/0293968 A1    Oct. 11, 2018

(30) Foreign Application Priority Data

Apr. 4, 2017    (JP) .................................. 2017-074817

(51) Int. Cl.
*G04B 13/00*      (2006.01)
*G10G 1/04*       (2006.01)
(Continued)

(52) U.S. Cl.
CPC ........... *G10G 1/04* (2013.01); *G06F 17/2288* (2013.01); *G06F 17/241* (2013.01);
(Continued)

(58) Field of Classification Search
CPC .. G10G 1/04; G10H 1/0008; G10H 2210/086; G10H 2220/096; G10H 2220/121
(Continued)

(56) References Cited

U.S. PATENT DOCUMENTS 5,728,960 A *  3/1998  Sitrick ................. G09B 15/023
                                                     84/464 R
6,348,648 B1 *  2/2002  Connick, Jr. ........ G09B 15/023
                                                     84/477 R
(Continued)

FOREIGN PATENT DOCUMENTS

JP    2003-107986 A    4/2003
JP    2013-097023 A    5/2013
WO    2010006639 A1    1/2010

OTHER PUBLICATIONS

European Search Report, Application No. 18165608.3, dated Aug. 14, 2018, 10 pages.
(Continued)

*Primary Examiner* — Jeffrey Donels
(74) *Attorney, Agent, or Firm* — Patterson + Sheridan, LLP

(57) ABSTRACT

An electronic musical score apparatus 1 includes display units D1, D2 connected to each other to be openable and closeable, and can convert a writing made on display portions 11, 12 by a user into annotation data 1, associated with musical score page data but being manageable separately from the musical score page data, and store the annotation data 1. When an image of the associated musical score page data is displayed together with an image of the annotation data 1 on the display portions 11, 12 and then the user rewrites the annotation data 1, the electronic musical score apparatus 1 can provide a write history for the annotation data 1 by storing the annotation data 1 before the rewriting as first-generation annotation data 1 and storing the annotation data 1 after the rewriting as second-generation annotation data 1.

12 Claims, 22 Drawing Sheets

(51) Int. Cl.
*G06F 17/22* (2006.01)
*G06F 17/24* (2006.01)
*G10H 1/00* (2006.01)

(52) U.S. Cl.
CPC ..... *G10H 1/0008* (2013.01); *G10H 2210/086* (2013.01); *G10H 2220/096* (2013.01); *G10H 2220/121* (2013.01)

(58) Field of Classification Search
USPC .......................................................... 84/609
See application file for complete search history.

(56) References Cited

U.S. PATENT DOCUMENTS

| | | | | |
|---|---|---|---|---|
| 6,483,019 | B1 | 11/2002 | Hamilton | |
| 7,183,476 | B2 * | 2/2007 | Swingle | G10G 1/00 84/477 R |
| 7,297,856 | B2 * | 11/2007 | Sitrick | G09B 15/002 84/470 R |
| 7,612,278 | B2 * | 11/2009 | Sitrick | G09B 15/002 84/609 |
| 8,552,281 | B1 * | 10/2013 | Cotrone | G09B 15/00 84/477 R |
| 8,859,875 | B2 * | 10/2014 | Daniels | G09B 15/023 84/634 |
| 9,225,755 | B2 * | 12/2015 | Sitrick | G06Q 10/101 |
| 9,280,960 | B1 * | 3/2016 | Clarke | G10H 7/00 |
| 2005/0204889 | A1 * | 9/2005 | Swingle | G10G 1/00 84/100 |
| 2011/0132172 | A1 * | 6/2011 | Gueneux | G10G 1/00 84/454 |
| 2013/0024418 | A1 * | 1/2013 | Sitrick | G06Q 10/101 707/608 |
| 2014/0000438 | A1 * | 1/2014 | Feis | G10G 1/00 84/453 |
| 2014/0216233 | A1 * | 8/2014 | Zhonggang | G06F 3/02 84/486 |
| 2015/0095822 | A1 * | 4/2015 | Feis | G10G 1/00 715/765 |

OTHER PUBLICATIONS

Kahan J et al: "Annotea: an open RDF 1 infrastructure for shared Web annotations", Computer NETW, Elsevier, Amsterdam, NL, vol. 39, No. 5, Aug. 5, 2002 (Aug. 5, 2002), pp. 589-608.

* cited by examiner

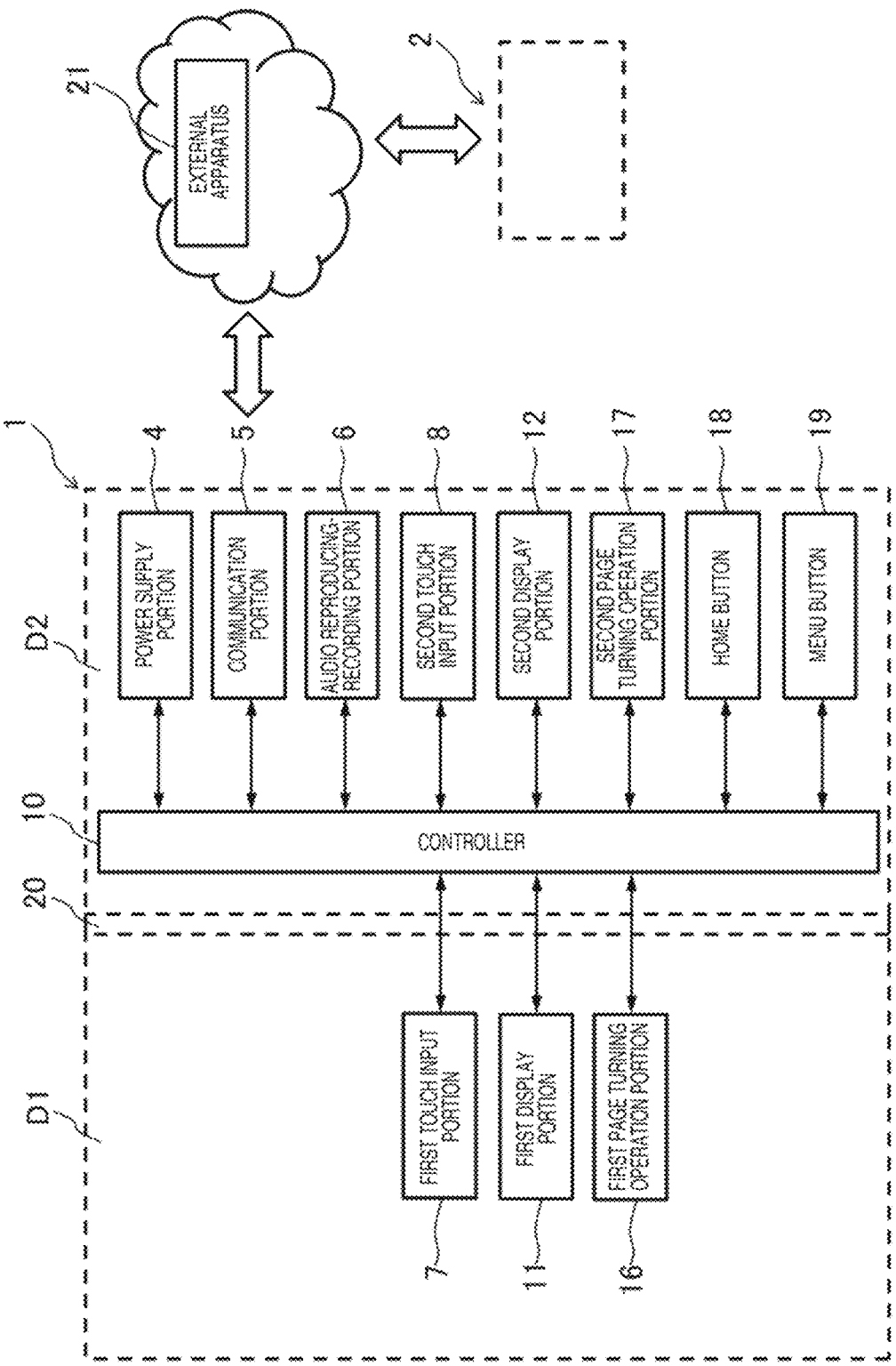

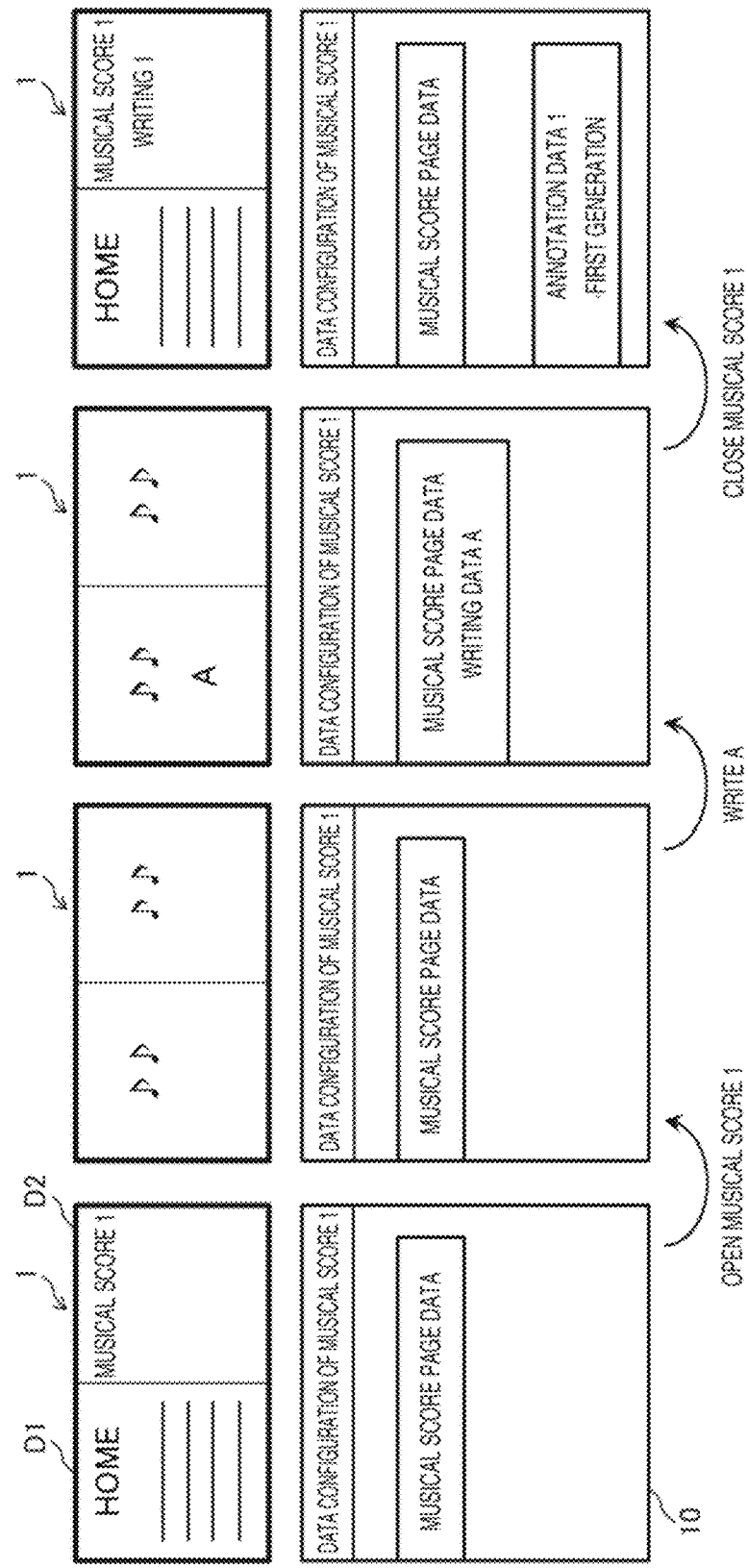

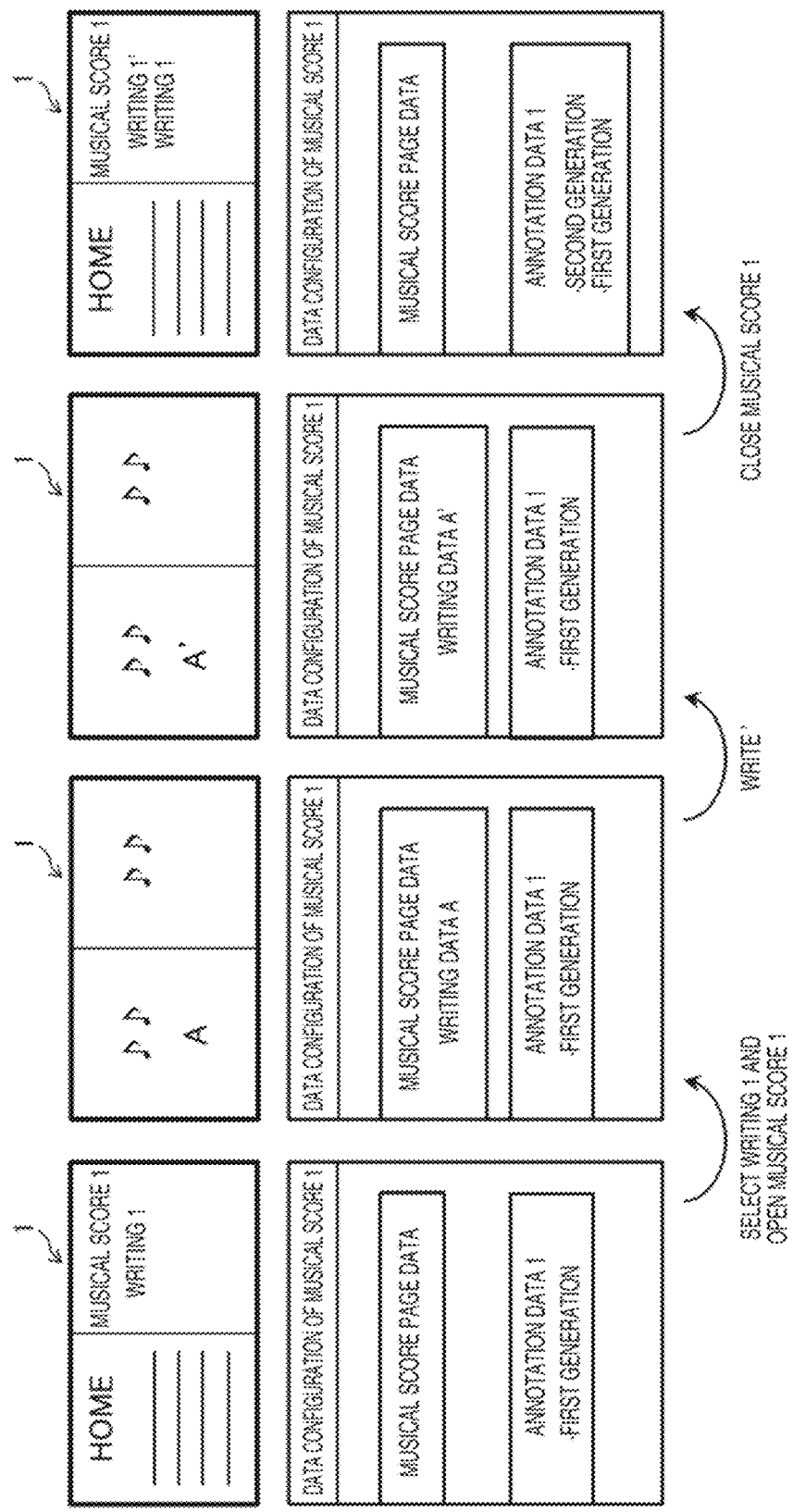

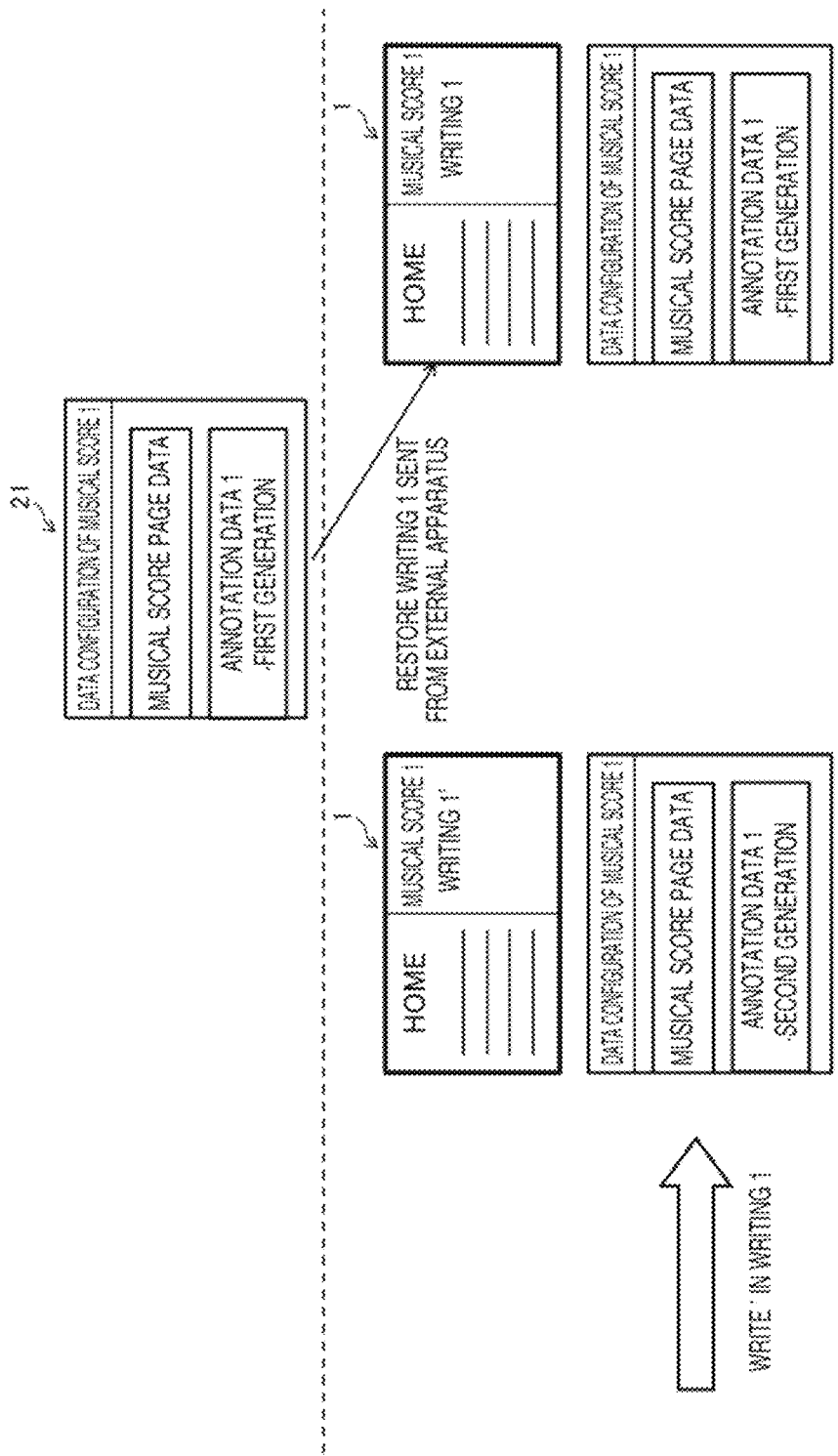

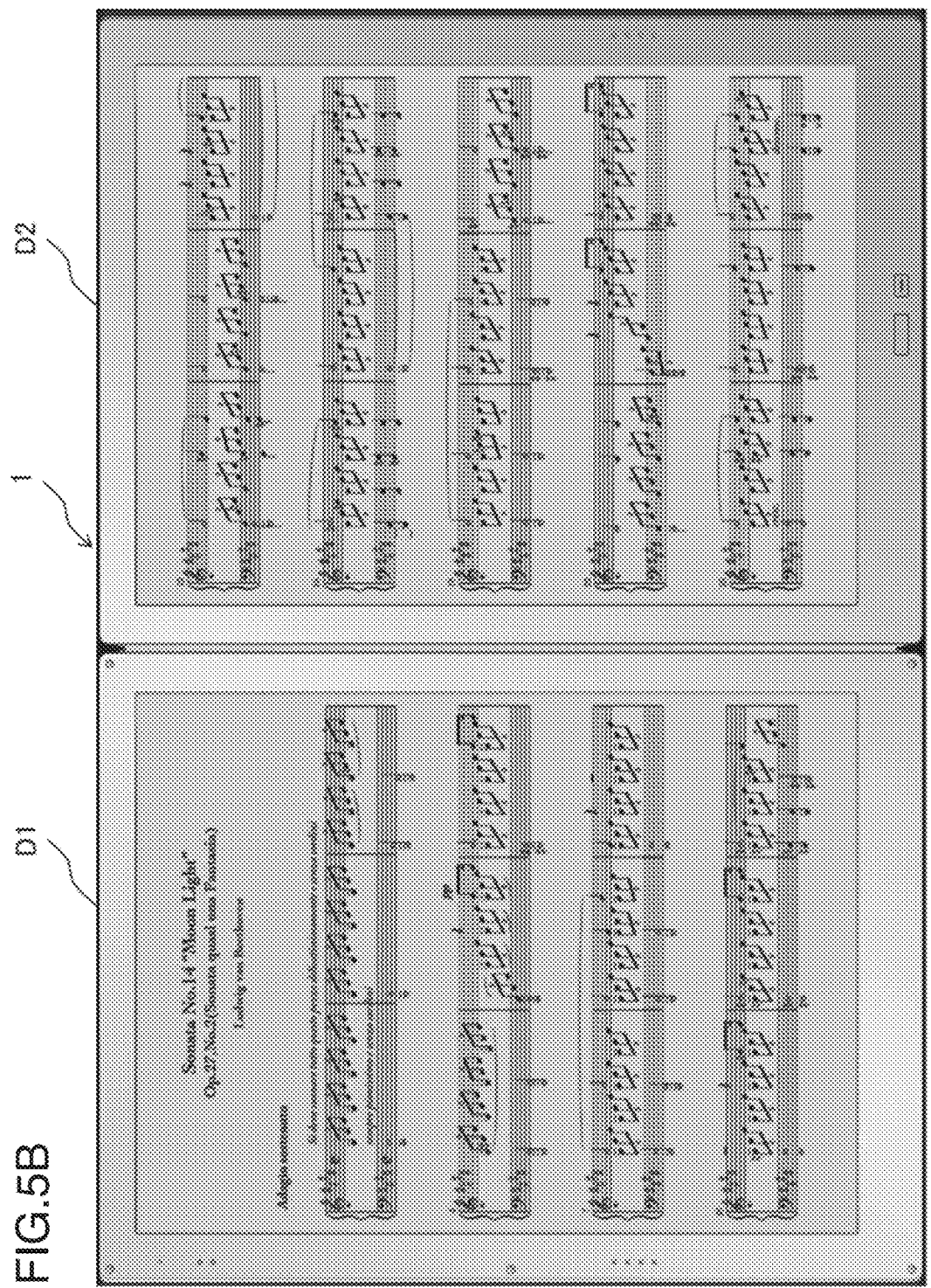

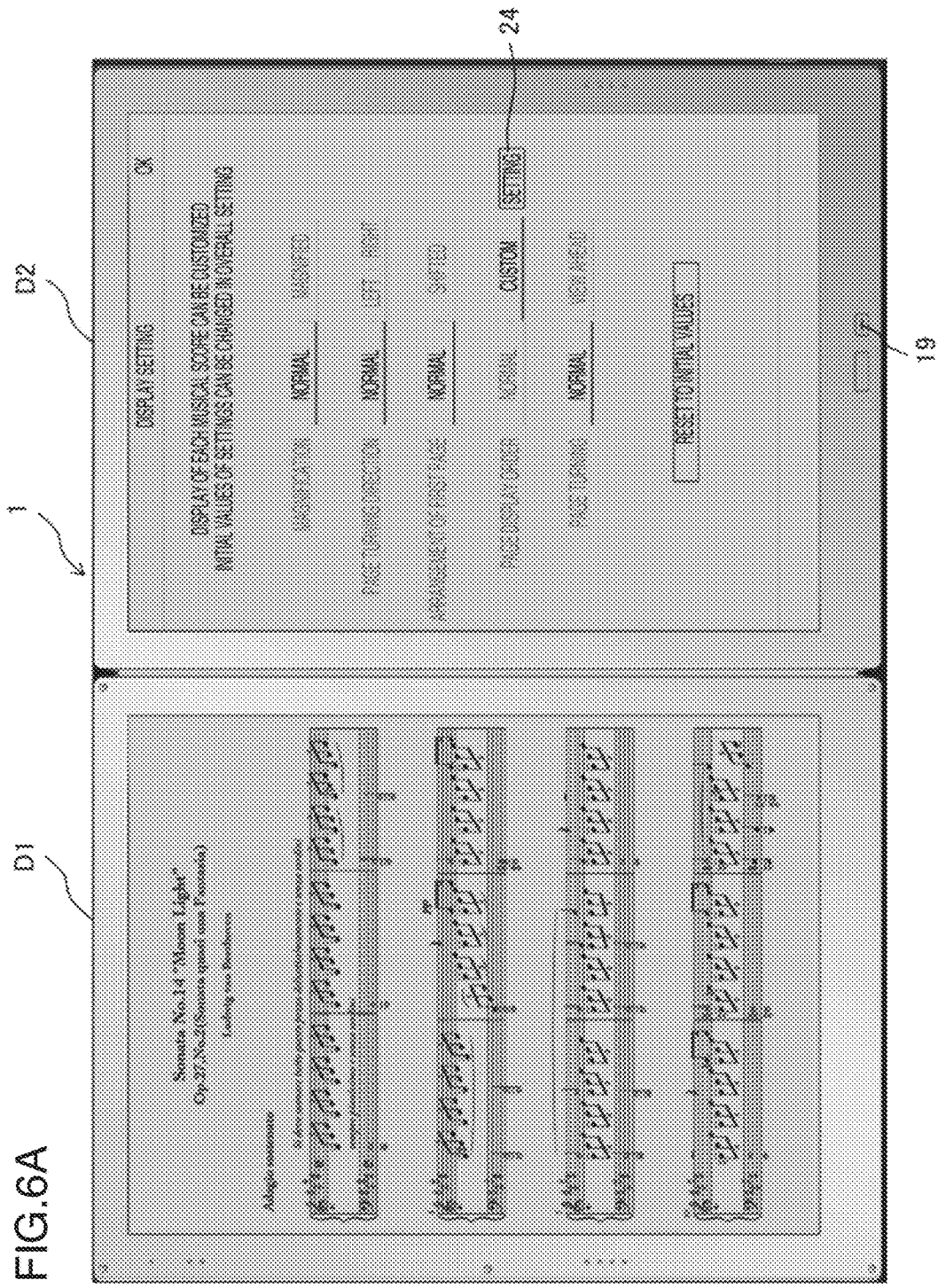

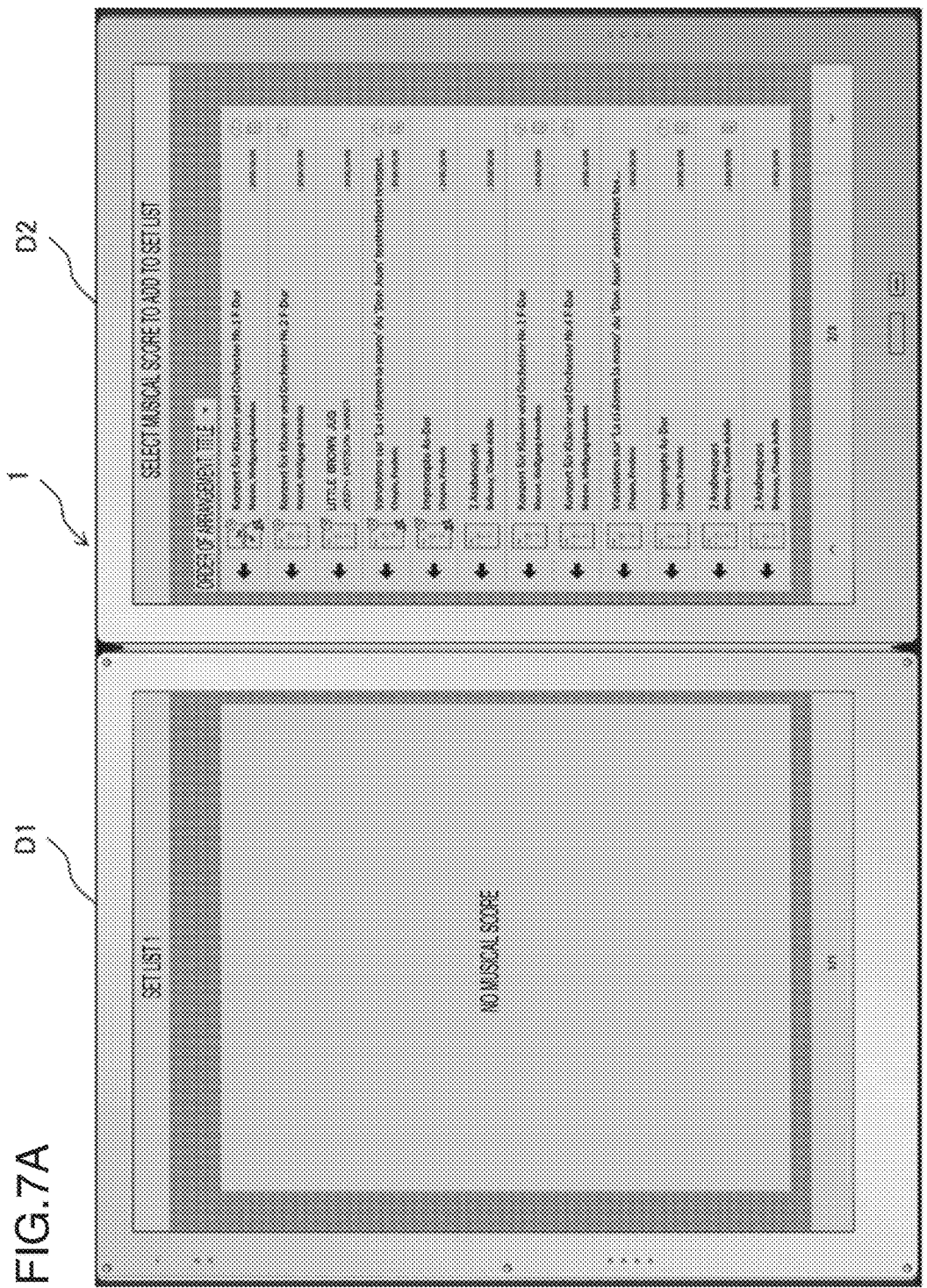

ELECTRONIC MUSICAL SCORE APPARATUS

BACKGROUND OF THE INVENTION

The present invention relates to an electronic musical score apparatus which includes at least two displays.

Production of a musical piece and creation of a musical score (hereafter, also referred to as "SCORE") using a Digital Audio Workstation (DAW) for music production and a personal computer (PC) with an application for music production are widely performed.

In addition to input means such as a mouse and a keyboard, a touch panel display which enables handwriting input is used to enable direct input from a display of the PC. Moreover, an electronic musical score apparatus including two displays is also known.

JP-A-2003-107986 discloses an information processing apparatus which includes two display screens modeled on a musical score and which allows a user to make a free writing on a displayed image such as an electronic musical score. In the information processing apparatus, first and second operation button groups are provided in a display. The first operation button group includes software buttons for instructing musical score operations such as forward page turning, backward page turning, returning to the first page, saving a musical score, and displaying of another musical score and software buttons for instructing processing such as various settings and deletion and saving of a handwritten image. The second operation button group includes software buttons for instructing switching of an operation mode. Moreover, in the information processing apparatus, musical score page data and handwriting data are managed respectively in different layers and an image corresponding to the musical score data and an image corresponding to the handwriting data are displayed one over the other. Furthermore, a network can be constructed by multiple information processing apparatuses, so that the multiple information processing apparatuses can share data saved in the information processing apparatuses by exchanging the data.

JP-A-2013-97023 discloses a display apparatus including a first display unit and a second display unit which are two display screens and input means which allows input of an operation for rewriting a display of an image, specifically, for example, an instruction of page turning. In the display apparatus, when a forward button is pressed in a situation where the first page and the second page are displayed respectively on a left screen and a right screen and an icon is displayed on the left screen being a target of rewriting, the display on the left screen is rewritten from the first page to the third page.

SUMMARY OF THE INVENTION

The information processing apparatus disclosed in JP-A-2003-107986 manages the musical score page data and the handwriting data respectively in the different layers and can further manage multiple pieces of handwriting data and display any of the pieces of handwriting data. However, the information processing apparatus cannot restore past writing once it is deleted. Particularly, in the case where the handwriting data is shared by multiple information processing apparatuses, when one user deletes the writing in the shared handwriting data, the other users cannot view the deleted handwriting again.

The display apparatus disclosed in JP-A-2013-97023 constantly displays the icon on the display screen being the target of rewriting. Accordingly, the user cannot instantly determine a page order relationship between a page displayed on the display screen being the target of rewriting and a page displayed on a display screen not being the target of rewriting.

There is thus a demand for a new electronic musical score apparatus with improved usability for the user. The present invention has been made in view of the aforementioned problems and an object thereof is to provide an electronic musical score apparatus in which a configuration of musical score data has excellent manageability and another object is to provide an electronic musical score apparatus with a high operability for the user that is, for example, a performer during a performance.

According to one aspect of the present invention, an electronic musical score apparatus includes at least two display units connected to each other to be openable and closeable. The at least two display units includes: a memory configured to store musical score page data and an application program; display portions provided respectively in the at least two display units, the display portions configured to display images based on the musical score page data and allow a user to make a writing on the display portions; a controller configured to control image display in the display portions of the display units; and a communication portion configured to perform data communication with an external apparatus based on the application program in response to an instruction from the controller. The electronic musical score apparatus is capable of converting the writing made by the user into first annotation data, associated with the musical score page data but being manageable separately from the musical score page data, and of causing the first annotation data to be stored. When the electronic musical score apparatus displays an image of the associated musical score page data together with an image of the first annotation data on the display portions and then the user rewrites the first annotation data, the electronic musical score apparatus is capable of providing a write history for the first annotation data by causing the first annotation data before the rewriting to be stored as first-generation first annotation data and by causing the first annotation data after the rewriting to be stored as second-generation first annotation data.

In a specific example of the present invention, the electronic musical score apparatus displays the image of the associated musical score page data on the display portions together with one of the first-generation and second-generation first annotation data.

In a specific example of the present invention, the electronic musical score apparatus is capable of sending the musical score page data and the first-generation and second-generation first annotation data to the external apparatus via the communication portion to cause the musical score page data and the first-generation and second-generation first annotation data to be stored in the external apparatus.

In a specific example of the present invention, only the second-generation first annotation data out of the first-generation and second-generation first annotation data is stored.

In a specific example of the present invention, the electronic musical score apparatus receives the first-generation first annotation data stored in the external apparatus via the communication portion and displays an image of the first-generation first annotation data on the display portions.

In a specific example of the present invention, the electronic musical score apparatus is capable of causing a writing made by the user on the display portions to be stored as second annotation data different from the first annotation data, and displays the image of the associated musical score page data on the display portions together with one of the first and second annotation data.

In a specific example of the present invention, when a second electronic musical score apparatus connectable to the external apparatus receives one of the first-generation and second-generation first annotation data stored in the external apparatus and displays an image of the received data and a user of the second electronic musical score apparatus makes a writing, the second electronic musical score apparatus provides a further history by storing the writing made by the user of the second electronic musical score apparatus in the external apparatus as third-generation annotation data for the first annotation data, and the electronic musical score apparatus receives the third-generation first annotation data stored in the external apparatus via the communication portion and displays an image of the third-generation first annotation data on the display portions.

In a specific example of the present invention, a writing made by the user of the second electronic musical score apparatus can be stored in the external apparatus as third annotation data different from the first annotation data and the electronic musical score apparatus receives the third annotation data stored in the external apparatus via the communication portion and displays an image of the third annotation data on the display portions.

In a specific example of the present invention, after a performance for a page of a musical score displayed on one of the display portions of the at least two display units is completed, the electronic musical score apparatus performs view-ahead image display in which the page of the musical score displayed on the one display portion is switched to a page subsequent to a page of the musical score displayed on the other display portion for which a performance is being made, and simultaneously displays an icon indicating execution of the view-ahead image display, and while the performance is being made for the page of the musical score displayed on the one display portion in the view-ahead image display, the electronic musical score apparatus deletes the icon.

In a specific example of the present invention, for the musical score page data including a plurality of pages, the electronic musical score apparatus is capable of inserting at least one of the plurality of pages before and/or after one of the plurality of pages.

In a specific example of the present invention, the electronic musical score apparatus is capable of causing musical score data of a plurality of musical pieces to be stored and of causing at least two musical pieces selected from the plurality of musical pieces to be stored as one set with the selected musical pieces arranged in the order of performance, and when an image of the musical score data of one musical piece in the set is displayed on the display portions, the electronic musical score apparatus performs music interval display after reaching a last page of the one musical piece by page turning and before displaying a musical piece following the one musical piece, the music interval display allowing the user to recognize names of the one musical piece and the following musical piece.

In a specific example of the present invention, the electronic musical score apparatus further includes a page turning operation portion used to return from a page displayed on each of the display portions based on the musical score data to a previous page and display the previous page and to proceed from the displayed page to a subsequent page and display the subsequent page, and the page turning operation portion includes an IR LED and an IR sensor.

According to the present invention, the electronic musical score apparatus has an excellent manageability not only for a writing made by each user but also for writings made by the multiple users. Moreover, the electronic musical score apparatus can improve operability during a performance.

Other objects, features and advantages of the present invention will become apparent from the following description of the embodiments of the present invention taken in conjunction with the accompanying drawings.

BRIEF DESCRIPTION OF THE DRAWINGS

FIG. 2 is a functional block diagram of the electronic musical score apparatus in FIG. 1A and an external apparatus.

FIG. 4A is a schematic view of the case where annotation data of a writing made on a musical score page displayed on a display portion of the electronic score apparatus in FIG. 1A is stored.

FIG. 4B is a schematic view of the case where annotation data of a rewriting made on the musical score page displayed on the display portion of the electronic score apparatus in FIG. 1A is stored.

FIG. 4E is a schematic view of the case where the annotation data stored in the external apparatus is restored in the electronic score apparatus in FIG. 1A.

FIG. 5B is a view illustrating a screen displayed before the view-ahead, for the musical score displayed in the display portions of the electronic score apparatus in FIG. 1A.

FIG. 6A is a view illustrating a first screen for setting a custom display order function in the page turning for the musical score displayed in the display portions of the electronic score apparatus in FIG. 1A.

FIG. 7A is a view illustrating a first screen for creating a set of musical pieces to be displayed on the display portions in the order of performance, the musical pieces selected from multiple musical pieces stored in the electronic musical score apparatus in FIG. 1A.

DETAILED DESCRIPTION OF THE EMBODIMENT

An example of the present invention is described below with reference to the drawings. However, the present invention is not limited to the embodiment.

Figure 1A:
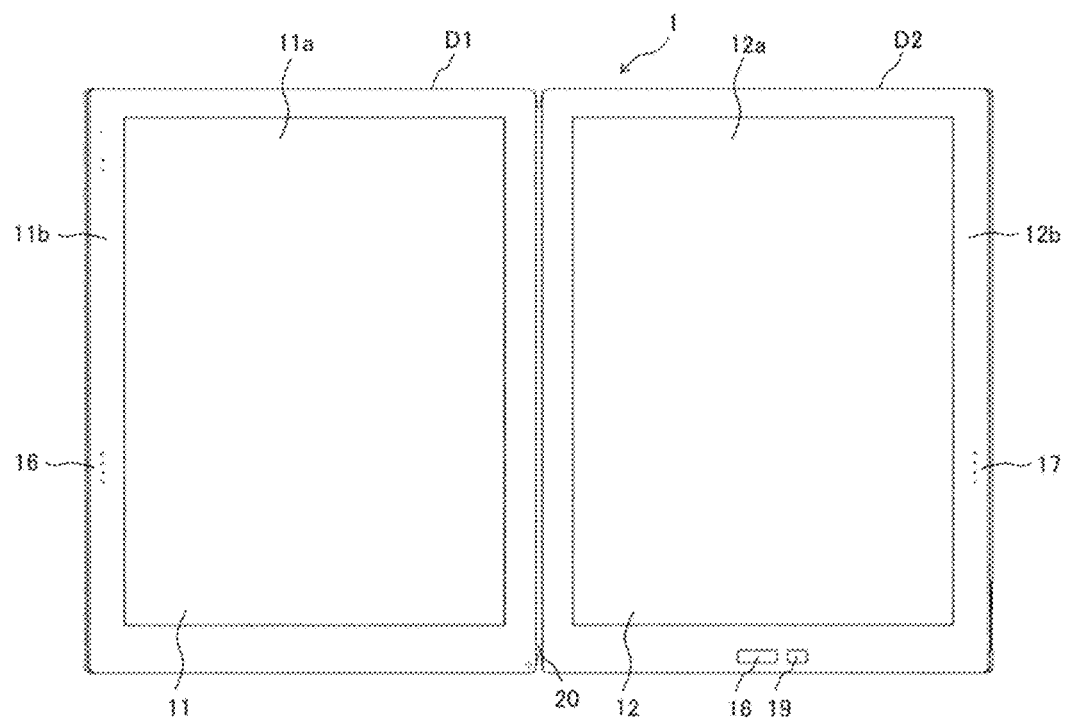
FIG. 1A is a front exterior view of an electronic musical score apparatus as an embodiment of the present invention in a state where two display units of the electronic musical score apparatus on left and right are opened at about 180 degrees.
Figure 1B:
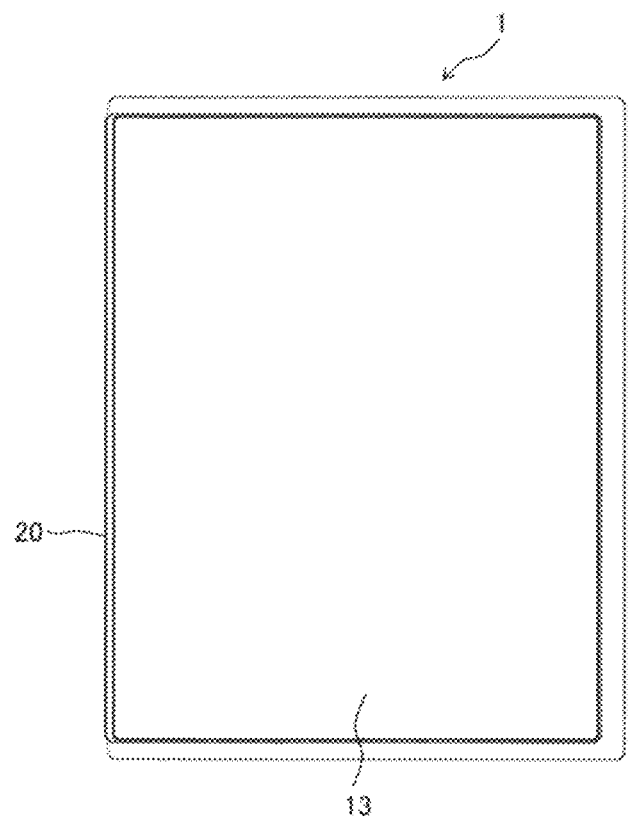
FIG. 1B is a front exterior view of the electronic musical score apparatus in FIG. 1A in a state where the two display units of the electronic musical score apparatus on left and right are closed.
Figure 1C:
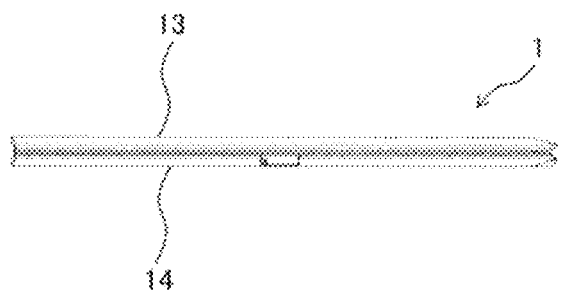
FIG. 1C is a bottom exterior view of the electronic musical score apparatus in the state of FIG. 1B.

FIGS. 1A to 1C illustrate an exterior of an electronic musical score apparatus 1 as an embodiment of the present invention. More specifically, FIG. 1A is a front exterior view of the electronic musical score apparatus 1 in a state where a first display unit D1 and a second display unit D2 of the electronic musical score apparatus 1 are opened at about 180 degrees. FIG. 1B is a front exterior view of the electronic musical score apparatus 1 in a state where the first and second display units D1, D2 are closed. FIG. 1C is a bottom exterior view of the electronic musical score apparatus 1 in the state where the first and second display units D1, D2 are closed. Note that, although the electronic musical score apparatus 1 in FIGS. 1A to 1C includes two display units on the left and right referred to as the first display unit D1 and the second display unit D2, the electronic musical score apparatus 1 is not limited to this configuration and may include three or more display units.

The first display unit D1 includes a first display portion 11 and a first case 13 provided on a back surface of the first display portion 11. The second display unit D2 includes a second display portion 12 and a second case 14 provided on a back surface of the second display portion 12. In the state where the electronic musical score apparatus 1 is closed, a display screen 11a of the first display portion 11 and a display screen 12a of the second display portion 12 face each other.

As illustrated in FIG. 1A, the first display portion 11 and the second display portion 12 are aligned in a longitudinal direction and a user can simultaneously view two display screens of the display screen of the first display portion 11 and the display screen of the second display portion 12.

The first display portion 11 includes the first display screen 11a and a first frame 11b. A first page turning operation portion 16 for turning a page of a musical score displayed on the first display screen 11a and/or the second display screen 12a is provided at a certain position in the first frame 11b. The second display portion 12 includes the second display screen 12a and a second frame 12b. A second page turning operation portion 17 for turning the page of the musical score displayed on the first display screen 11a and/or the second display screen 12a is provided at a certain position in the second frame 12b. Moreover, a home button 18 for jumping to a HOME page and a menu button 19 for causing a menu to pop up are provided at certain positions in the first display portion 11 and/or the second display portion 12.

FIG. 2 illustrates a functional block diagram illustrating a detailed configuration of the electronic musical score apparatus 1. The first display unit D1 includes the first display portion 11, a first touch input portion 7 which provides a touch panel function to the first display screen 11a of the first display portion 11, and the first page turning operation portion 16. Meanwhile, the second display unit D2 includes the second display portion 12, a second touch input portion 8 which provides a touch panel function to the second display screen 12a of the second display portion 12, and the second page turning operation portion 17. The second display unit D2 further includes a power supply portion 4, a communication portion 5, an audio reproducing-recording portion 6, a controller 10, the home button 18, and the menu button 19.

The communication portion 5 is configured to exchange information with another electronic musical score apparatus 1 of the present invention and with an external apparatus 21 other than the electronic musical score apparatuses 1 by using at least one of various wired and wireless communication methods. In this description, the "external apparatus" may include mobile terminals such as a smartphone and a tablet PC, a computer server, a cloud service, and the like, in addition to the electronic musical score apparatus 1.

As the communication portion 5 for the various wired and/or wireless communication methods, there may be utilized the Internet connection with the outside, a module for performing a cellular communication, a wireless LAN communication, or a near-field communication, and a wired communication module for performing communication with the outside via a predetermined connector such as Universal Serial Bus (USB), High-Definition Multimedia Interface (HDMI) (registered trademark), Institute of Electronical and Electronics Engineers (IEEE) 1394, or a wired LAN.

Any of a Bluetooth (registered trademark) module, a Wi-Fi module, an infrared communication module, and the like may be utilized as the near-field communication module.

It is preferable that the electronic musical score apparatus 1 can communicate with multiple electronic musical score apparatuses such as a second electronic musical score apparatus 2. In Bluetooth (registered trademark), the electronic musical score apparatus 1 is configured to be connectable to multiple electronic musical score apparatuses 1 via multiple channels.

The controller 10 includes a central processing unit (CPU), a non-volatile and/or volatile memory, and a Graphics Processing Unit (GPU) for controlling screen display of the first and second display portions 11, 12, and performs control and data communication with units such as, in addition to the communication portion 5, the power supply portion 4, the audio reproducing-recording portion 6, the first and second display portions 11, 12, the first and second touch input portions 7, 8, the first and second page turning operation portions 16, 17, the home button 18, and the menu button 19, based on an application program stored in the memory.

The electronic musical score apparatus 1 may be configured such that many of the major electronic units for controlling the entire electronic musical score apparatus 1 except for control devices for achieving the functions of the first display portion 11, the first touch input portion 7, and the first page turning operation portion 16 are provided in the second display unit D2 and information inputted on the first and second display units D1, D2 and information to be outputted to the first and second display units D1, D2 are collectively controlled and processed in the second display unit D2. Specifically, the first display unit D1 has electric hardware configurations for performing control for minimal operations which need to be performed in the first display unit D1 such as a display function by the first display portion 11, a handwriting input function by the first touch input portion 7, and a page turning function by the first page turning operation portion 16. Meanwhile, the second display unit D2 has other necessary hardware configurations such as the controller 10 being the main controller, the power supply portion 4, the communication portion 5, the audio reproducing-recording portion 6, the home button 18, and the menu button 19 to control the entire first and second display units D1, D2 in addition to a display function by the second display portion 12, a handwriting input function by the second touch input portion 8, and a page turning function by the second page turning operation portion 17. The weight of electronic components included in the first display unit D1 is thereby reduced and the weight of the second display unit D2 is increased relative to the first display unit D1. This facilitates opening and closing of the first display unit D1 for the user. As a matter of course, the weight ratio between the display units can be determined as appropriate and the arrangement configuration of the hardware configurations can be determined depending on the determined ratio.

Referring to FIG. 1A, the first and second display units D1, D2 are connected via a hinge 20 to be openable and closeable. The hinge 20 is configured by, for example, a flexible printed circuit (FPC) sandwiched between elastic sheets on both sides of the FPC. The hinge 20 may be configured to be directly or indirectly held between the frame 11*b* (12*b*) in the display portion 11 (12) of the first (second) display unit D1 (D2) and the case 13 (14) on the opposite side to the frame 11*b* (12*b*) such that the first and second display units D1, D2 are openable and closeable in a spread manner with the strength of the hinge 20 being maintained. As illustrated in FIG. 2, electrical signal exchange between the first and second display units D1, D2 is performed via the flexible printed circuit of the hinge 20. Note that the electronic musical score apparatus 1 may include three or more display units. When the electronic musical score apparatus 1 includes, for example, three display units, the three display units may be connected via two hinges such that the display units are openable and closable in a three-fold manner.

Parts in the second display unit D2 may be configured to be arranged such that the center of gravity of the entire second display unit D2 is at a position shifted toward the hinge 20 and downward from the center of the second display unit D2 in the front view. For example, the positions of the electrical components such as the power supply portion 4 and the controller 10 which are electronic parts incorporated in the second display unit D2 may be adjusted and arranged such that the load center of the entire second display unit D2 is on the hinge 20 side and below the center. Moreover, since the first display unit D1 is lighter than the second display unit D2 as described above, the center of gravity is less likely to shift and the electronic musical score apparatus 1 can be stably placed on a tilted music stand. Note that the power supply portion 4 may be configured by a battery which receives power supply from the outside via a power terminal such as the USB and stores the power.

Figure 3:
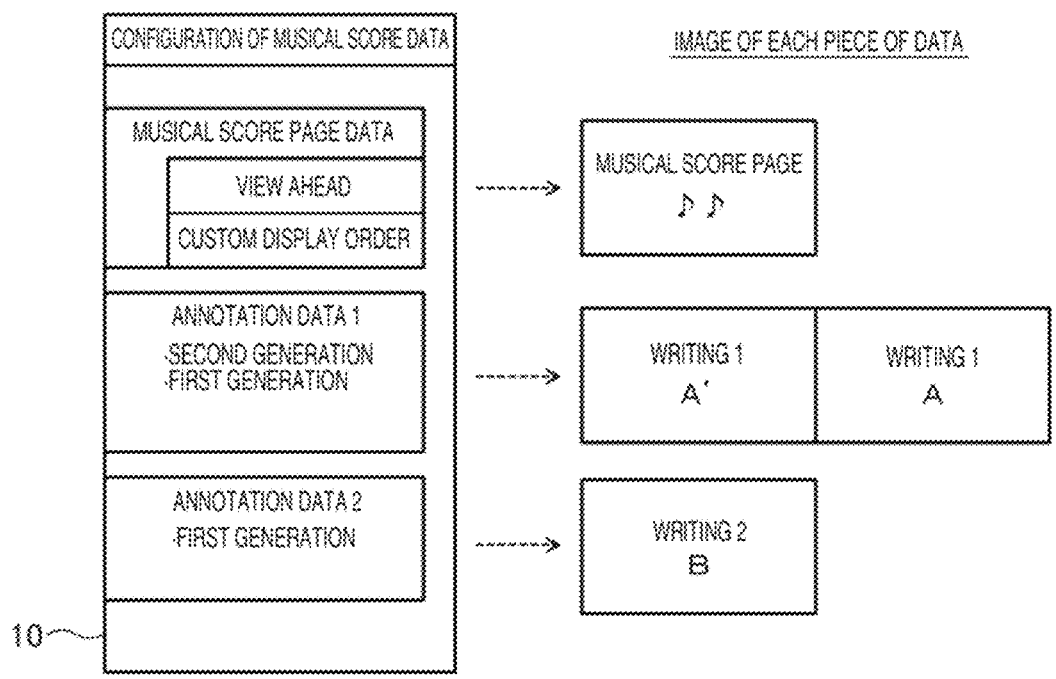
FIG. 3 is a schematic view illustrating a configuration of musical score data used in the electronic musical score apparatus in FIG. 1A.

FIG. 3 illustrates a configuration of musical score data used in the electronic musical score apparatus 1. The musical score data includes musical score page data which indicates information such as musical notes for a musical performance, pieces of annotation data 1, 2 which are written with a touch pen or the like on the first and second touch input portions 7, 8, and the like. Moreover, a view-ahead function and a custom display order function to be described later may be added to the musical score page data. PDF data can be given as an example of the musical score page data but the musical score page data is not limited to this. The musical score page data may be any data which can display a musical score on the first and second display portions 11, 12. The electronic musical score apparatus 1 can associate a writing 1 (A) made on the musical score page by the user of the electronic musical score apparatus 1 with the musical score page data on which the writing is made. The electronic musical score apparatus 1 can also convert the writing 1 (A) into the annotation data 1 which is managed separately from the musical score page data on which the writing is made and store the annotation data 1 in the memory of the controller 10. When the images of the musical score page data and the annotation data 1 are displayed on the first and second display portions 11, 12 to display the musical score page together with the writing 1 (A) and then the user makes a rewriting on the writing 1 (A) as a writing 1 (A'), the electronic musical score apparatus 1 stores the annotation data 1 before the rewriting in the memory as a first-generation annotation data and stores the annotation data 1 after the rewriting in the memory as a second-generation annotation data to provide a write history for the annotation data 1 of the writing 1 as the first generation and the second generation. Then, when the user makes further writings, the electronic musical score apparatus 1 can provide the write history as the third generation, the fourth generation, and beyond. Providing the write history as described above enables the writing 1 (A) before the rewriting to be displayed again on the first and second display portions 11, 12. Note that the writing described herein is a concept including not only the writing of characters and the like on the first and second display portions 11, 12 but also erasing of the written characters and the like on the first and second display portions 11, 12.

Moreover, the electronic musical score apparatus 1 can convert a writing 2 (B) made on the first and second display portions 11, 12 into the annotation data 2 managed separately from the annotation data 1 of the writing 1 (A, A') and store the annotation data 2 in the memory of the controller 10.

Configuring the musical score data as described above allows, for example, a player of an orchestra to create separate writings for the respective conductors and store the writings as pieces of annotation data corresponding to the respective conductors. Moreover, storing the writings while providing the generation-based history for each piece of annotation data can facilitate writing of characters and the like into the musical score page and erasing of the written characters and the like, and margins in the musical score page in which writing spaces are limited can be effectively utilized.

Figure 4C:
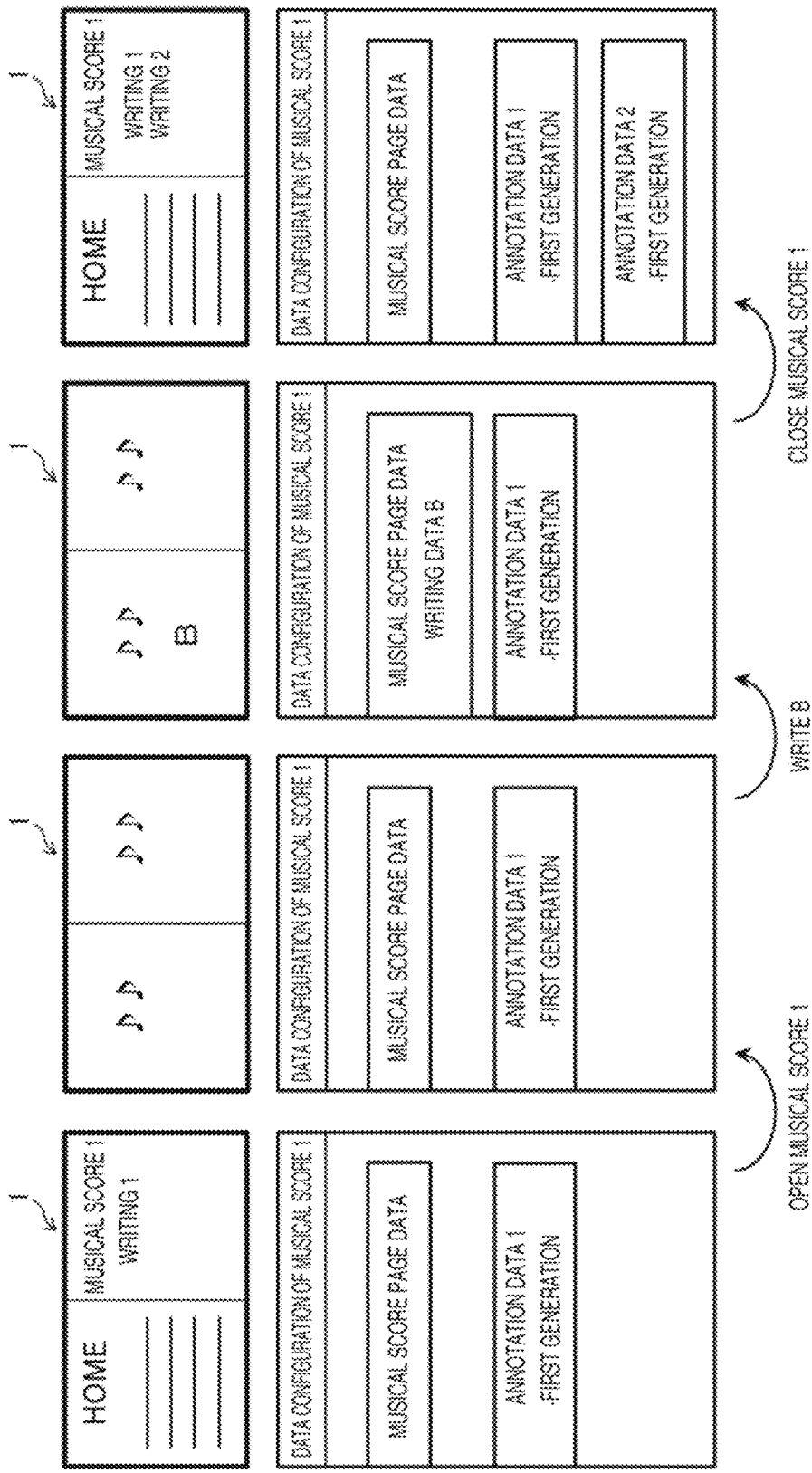
FIG. 4C is a schematic view of the case where annotation data of another writing made on the musical score page displayed on the display portion of the electronic score apparatus in FIG. 1A is stored.

FIGS. 4A to 4G illustrate several embodiments of a configuration of the musical score data used in the electronic musical score apparatus 1. However the configuration is not limited to these embodiments. FIG. 4A illustrates a configuration of musical score data in the case where a writing is made on the musical score page displayed on the first and second display portions 11, 12 of the first and second display units D1, D2. In the HOME page displayed on the first and second display portions 11, 12, a musical score 1 stored in the electronic musical score apparatus 1 is displayed. The musical score 1 is opened to display a musical score page of the musical score 1 on the first and second display portions 11, 12. When A is written on the first and second display portions 11, 12 and the musical score 1 is closed, the annotation data 1 for the writing 1 that is A is stored in the memory of the controller 10. An image is displayed on the first and second display portions 11, 12 such that the user can recognize presence of the writing 1 that is A.

FIG. 4B illustrates a configuration of musical score data in the case where a rewriting is made on the musical score page displayed on the first and second display portions 11, 12 of the first and second display units D1, D2. In the HOME page displayed on the first and second display portions 11, 12, the writing 1 of the first-generation annotation data 1 associated with the musical score page data of the musical score 1 is selected and the musical score 1 is opened to display the musical score page of the musical score 1 on the first and second display portions 11, 12. When ' is written on the first and second display portions 11, 12 and the musical score 1 is closed, the second-generation annotation data 1 for the writing 1' that is A' is stored in the memory of the controller 10. An image is displayed on the first and second display portions 11, 12 such that the user can recognize presence of the writing 1 that is A and the writing 1' that is A'. Then, the user can select one of the first-generation annotation data and the second-generation annotation data and open the musical score 1 to display the musical score page of the musical score 1 on the first and second display portions 11, 12.

FIG. 4C illustrates a configuration of musical score data in the case where another writing is made on the musical score page displayed on the first and second display portions 11, 12 of the first and second display units D1, D2. In the HOME page displayed on the first and second display portions 11, 12, the writing 1 of the first-generation annotation data 1 associated with the musical score page data of the musical score 1 is not selected and only the musical score 1 is opened to display the musical score page of the musical score 1 on the first and second display portions 11, 12. When B is written on the first and second display portions 11, 12 and the musical score 1 is closed, the annotation data 2 for the writing 2 which is B is stored in the memory of the controller 10, separately from the annotation data 1 for the writing 1 that is A. An image is displayed on the first and second display portions 11, 12 such that the user can recognize presence of the writing 1 that is A and the writing 2 which is B. As described above, the electronic musical score apparatus 1 can store the annotation data 1 for the writing 1 and the annotation data 2 for the writing 2 different from the annotation data 1 in the memory of the controller 10, and display the musical score page which is the musical score page data of the musical score 1 associated with the annotation data 1, 2 together with one of the writing 1 which is the annotation data 1 and the writing 2 which is the annotation data 2, on the first and second display portions 11, 12.

Figure 4D:
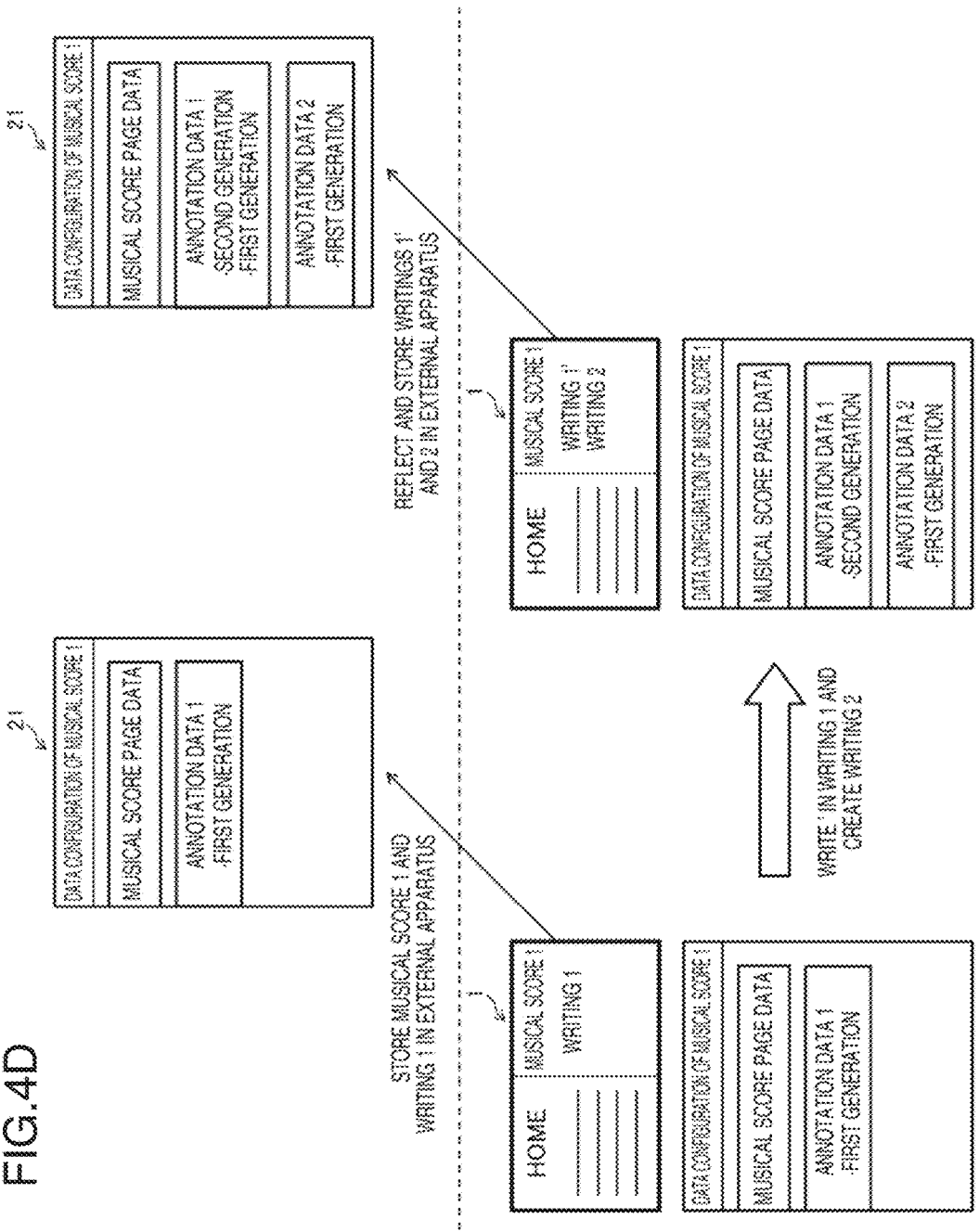
FIG. 4D is a schematic view of the case where annotation data of a writing made on the musical score page displayed on the display portion of the electronic score apparatus in FIG. 1A is stored in the external apparatus.

FIG. 4D illustrates a configuration of musical score data which is stored in the external apparatus 21 and which includes the musical score page data and the annotation data of the writings made on the musical score page displayed on the first and second display portions 11, 12 of the first and second display units D1, D2 of the electronic musical score apparatus 1. The electronic musical score apparatus 1 can send the musical score page data for the musical score 1 included in the musical score data of the musical score 1 and the first-generation annotation data 1 for the writing 1 to the external apparatus 21 via the communication portion 5 to store them in the external apparatus 21. Then, when ' is written in the first and second display portions 11, 12, the electronic musical score apparatus 1 can store the second-generation annotation data 1 for the writing 1' that is A' in the memory of the controller 10. Furthermore, the electronic musical score apparatus 1 can send the second-generation annotation data 1 for the writing 1' to the external apparatus 21 via the communication portion 5 to store it in the external apparatus 21. Moreover, when B is written in the first and second display portions 11, 12, the electronic musical score apparatus 1 can store the annotation data 2 for the writing 2 which is B in the memory of the controller 10 separately from the annotation data 1 for the writing 1 that is A. Furthermore, the electronic musical score apparatus 1 can send the first-generation annotation data 2 for the writing 2 to the external apparatus 21 via the communication portion 5 to store it in the external apparatus 21. As described above, the configuration of the musical score data of the musical score 1 stored in the external apparatus 21 includes the musical score page data, the first-generation annotation data 1, the second-generation annotation data 1, and the first-generation annotation data 2. Note that, in this case, only the second-generation annotation data 1 may be stored in the memory of the controller 10 of the electronic musical score apparatus 1. Storing only the second-generation annotation data 1 for the rewritten writing 1' in the memory of the controller 10 of the electronic musical score apparatus 1 as described above enables effective utilization of the space in the memory of the controller 10 of the electronic musical score apparatus 1.

FIG. 4E illustrates a configuration of musical score data in the case where the annotation data included in the musical score data stored in the external apparatus 21 is restored in the memory of the controller 10 of the electronic musical score apparatus 1. When ' is written on the first and second display portions 11, 12 and only the second-generation annotation data 1 for the writing 1' that is A' is stored in the memory of the controller 10, the electronic musical score apparatus 1 can receive the first-generation annotation data 1 for the writing 1 that is A stored in the past in the external apparatus 21 via the communication portion 5, restore the first-generation annotation data 1 by overwriting the second-generation annotation data 1 stored in the memory of the controller 10 with the first-generation annotation data 1, and display A as the writing 1 corresponding to the first-generation annotation data 1 on the first and second display portions 11, 12. The electronic musical score apparatus 1 can thereby restore A as the writing 1 without using additional spaces in the memory of the controller 10 of the electronic musical score apparatus 1.

Figure 4F:
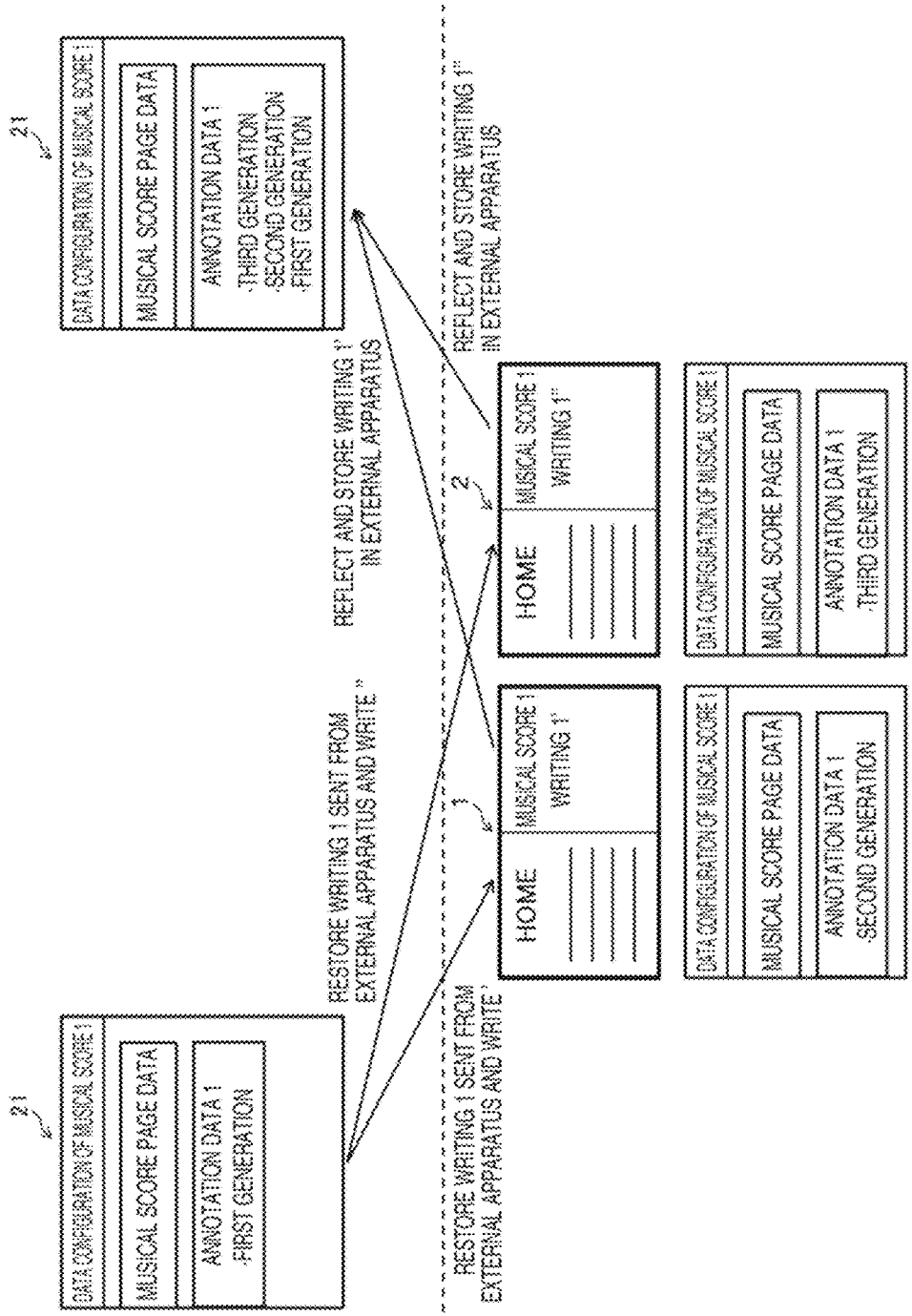
FIG. 4F is a schematic view of the case where the annotation data stored in the external apparatus is restored in two of the electronic score apparatuses in FIG. 1A and pieces of annotation data of rewritings made on the musical score page in the respective electronic score apparatuses are stored in the external apparatuses.

FIG. 4F illustrates a configuration of the musical score data in the case where: the electronic musical score apparatuses 1 and 2 are connectable to the external apparatus 21; the first-generation annotation data 1 stored in the external apparatus 21 is restored in the electronic musical score apparatuses 1 and 2; rewritings are made on the musical score page displayed on the first and second display portions 11, 12 of the first and second display units D1, D2 in the electronic musical score apparatuses 1 and 2; and the musical score data is stored in the external apparatus 21 to include the first-generation annotation data 1 before the rewritings and the second-generation annotation data 1 and the third-generation annotation data 1 generated by the rewritings. The electronic musical score apparatuses 1 and 2 can thereby share the musical score data of the common musical score 1. Note that, in addition to the electronic musical score apparatuses 1 and 2, more electronic musical score apparatuses can be connected to the external apparatus 21. Moreover, in order to limit the external apparatus 21 and/or the electronic musical score apparatus which can access the musical score data stored in the external apparatus 21, identification information (ID) for sharing the musical score data of the musical score 1 can be assigned to each electronic musical score apparatus.

The electronic musical score apparatus 1 can receive the first-generation annotation data for the writing 1 that is A stored in the past in the external apparatus 21 via the communication portion 5 of the electronic musical score apparatus 1, display A as the writing 1 corresponding to the first-generation annotation data 1 on the first and second display portions 11, 12 of the electronic musical score apparatus 1, when ' is written, store the second-generation annotation data 1 for the writing 1' that is A' in the memory of the controller 10 of the electronic musical score apparatus 1, and send the second-generation annotation data 1 for the writing 1' that is A' to the external apparatus 21 via the communication portion 5 of the electronic musical score apparatus 1 to store it in the external apparatus 21. Moreover, the electronic musical score apparatus 2 can receive the first-generation annotation data 1 for the writing 1 that is A stored in the past in the external apparatus 21 via the communication portion 5 of the electronic musical score apparatus 2, display A as the writing 1 corresponding to the first-generation annotation data 1 on the first and second display portions 11, 12 of the electronic musical score apparatus 2, when "is written, store the third-generation annotation data 1 for the writing 1" that is A" in the memory of the controller 10 of the electronic musical score apparatus 2, and send the third-generation annotation data 1 for the writing 1" that is A" to the external apparatus 21 via the communication portion 5 of the electronic musical score apparatus 2 to store it in the external apparatus 21. The three writings 1, 1', 1" which are A, A', A" can be thus stored in the external apparatus 21 as the first-generation to third-generation annotation data 1 with the history being provided. The users of the electronic musical score apparatuses 1 and 2 can thereby share the writings made by the users via the external apparatus 21. Moreover, the users can reproduce the past writings and make new writings.

Moreover, the electronic musical score apparatus 2 can receive one of the first-generation annotation data 1 and the second-generation annotation data 1 (for example, first generation) stored in the external apparatus 21 via the communication portion 5, display A as the writing 1 corresponding to the first-generation annotation data 1 on the first and second display portions 11, 12, when "is written, store the third-generation annotation data 1 for the writing 1" that is A" in the memory of the controller 10 of the electronic musical score apparatus 2, and send the third-generation annotation data 1 for the writing 1" that is A" to the external apparatus 21 via the communication portion 5 of the electronic musical score apparatus 2 to store it in the external apparatus 21. The three writings 1, 1', 1" which are A, A', A" can be thus stored in the external apparatus 21 as the first-generation to third-generation annotation data 1 with the history being provided. Then, the electronic musical score apparatus 1 can receive the third-generation annotation data 1 for the writing 1" that is A" stored in the external apparatus 21 via the communication portion 5 and display A" as the writing 1" corresponding to the third-generation annotation data 1 on the first and second display portions 11, 12. The writing made by the user of the electronic musical score apparatus 2 can be thus shared with the user of the electronic musical score apparatus 1 via the external apparatus 21.

Figure 4G:
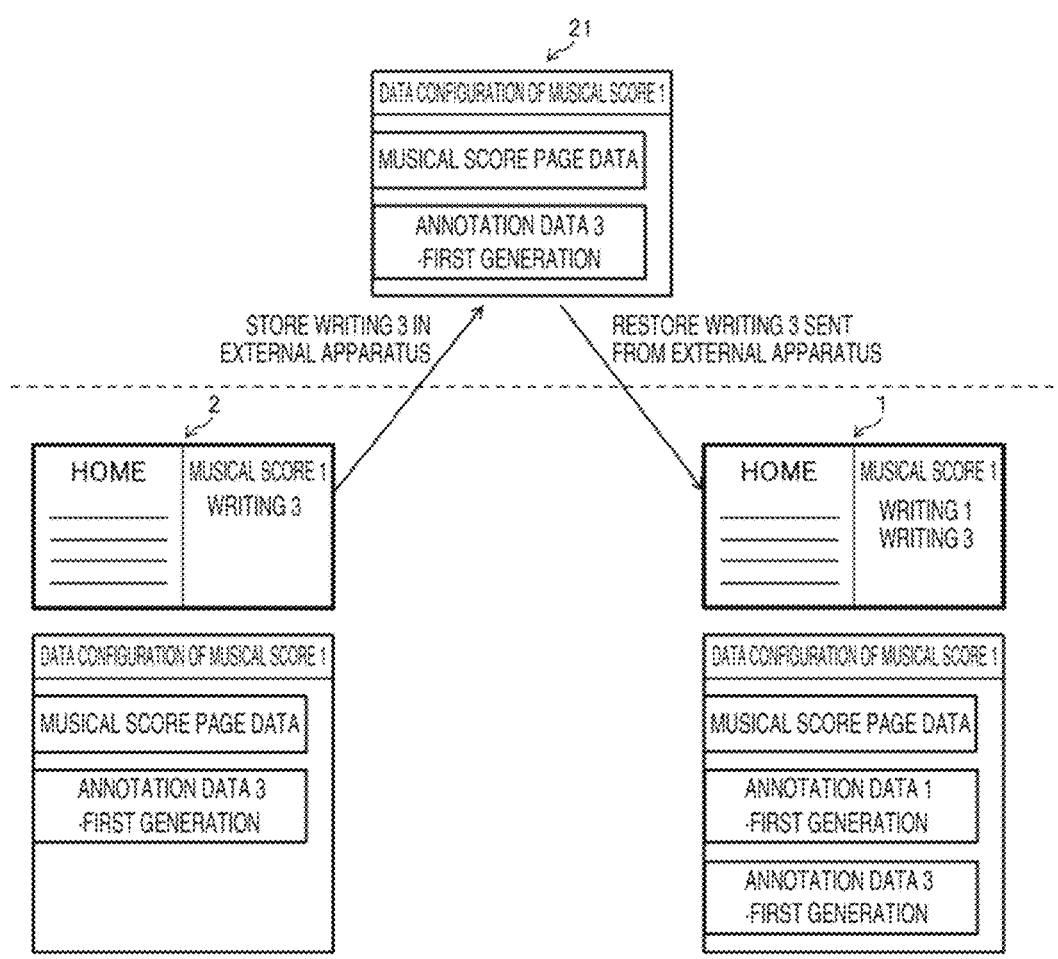
FIG. 4G is a schematic view of the case where the annotation data in one electronic score apparatus in FIG. 1A is stored in the external apparatus and the annotation data stored in the external apparatus is restored in another electronic score apparatus in FIG. 1A.

FIG. 4G illustrates a configuration of musical score data in the case where the annotation data 3 included in the musical score data stored in the external apparatus 21 is restored in the memory of the controller 10 of the electronic musical score apparatus 1. When the user of the electronic musical score apparatus 2 writes C on the first and second display portions 11, 12 of the first and second display units D1, D2, the electronic musical score apparatus 2 stores the first-generation annotation data 3 for the writing 3 which is C in the memory of the controller 10 and sends the first-generation annotation data 3 for the writing 3 which is C to the external apparatus 21 via the communication portion 5 to store it in the external apparatus 21. Then, the electronic musical score apparatus 1 can receive the first-generation annotation data 3 for the writing 3 being C which is stored in the past in the external apparatus 21 via the communication portion 5, store the first-generation annotation data 3 while managing it separately from the first-generation annotation data 1 already stored in the memory of the controller 10, and display C as the writing 3 corresponding to the first-generation annotation data 3 on the first and second display portions 11, 12. The writing 3 which is C can be thus shared between the users of the electronic musical score apparatuses 1 and 2 via the external apparatus 21.

Figure 5A:
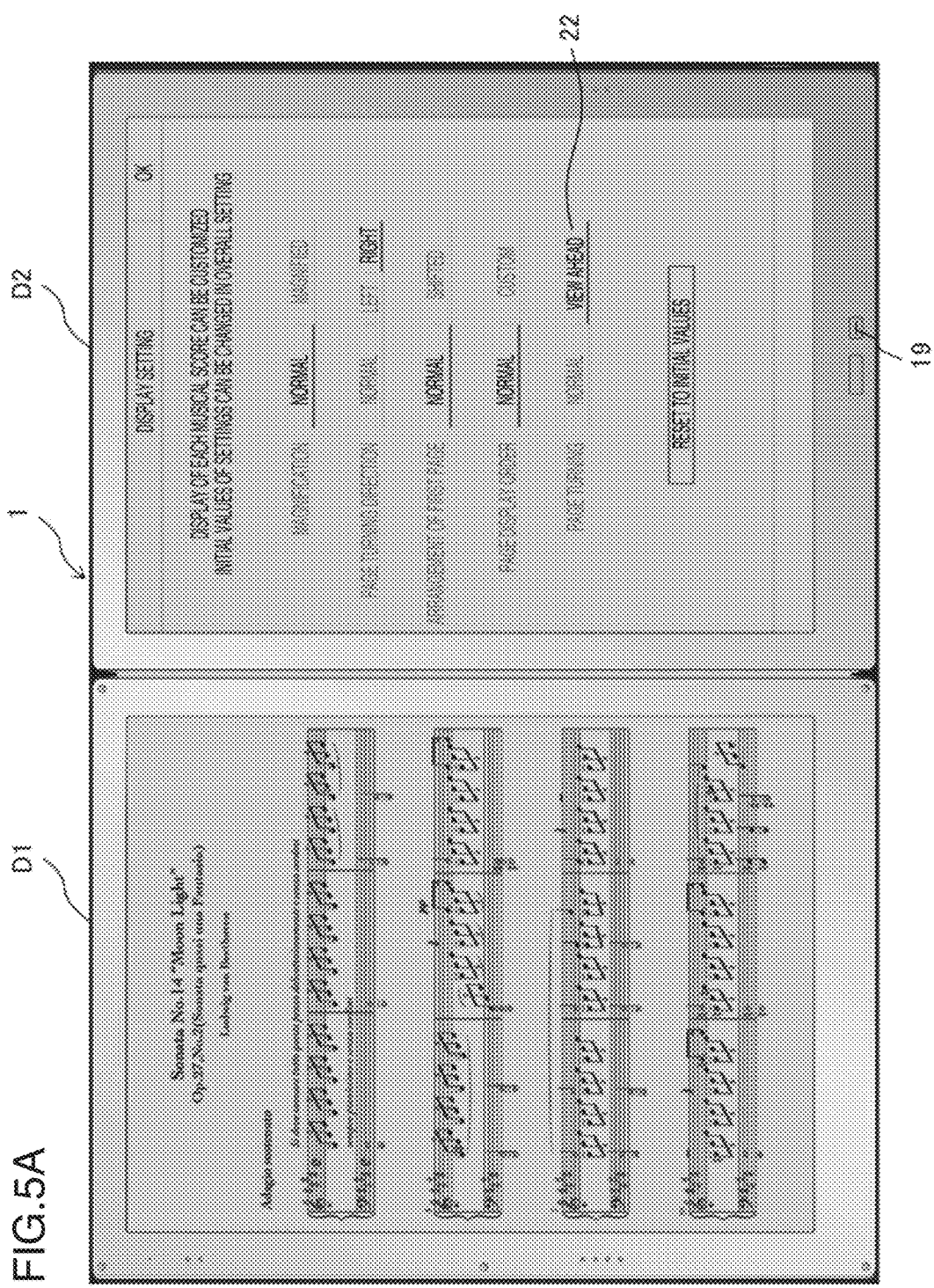
FIG. 5A is a view illustrating a first screen for setting a view-ahead function in page turning for a musical score displayed in the display portions of the electronic score apparatus in FIG. 1A.

FIGS. 5A to 5D illustrate a screen for setting a view-ahead function in the page turning for the musical score displayed on the first and second display portions 11, 12 of the first and second display units D1, D2 of the electronic musical score apparatus 1. As illustrated in FIG. 5A, a first screen for setting the view-ahead function of the page turning is displayed on the second display unit D2 by pressing the menu button 19. Incidentally, page turning of the musical score during a performance is troublesome for a performer. In order to avoid the trouble in the page turning, the view-ahead function is provided. In the view-ahead function, after a performance of the musical score page displayed on one of the first and second display portions 11, 12 (for example, the first display portion 11) is completed, the musical score page displayed on the first display portion 11 is switched to a musical score page subsequent to the musical score page displayed on the second display portion 12 for which the performance is being made, and the subsequent musical score page is displayed in advance of its performance.

Figure 5C:
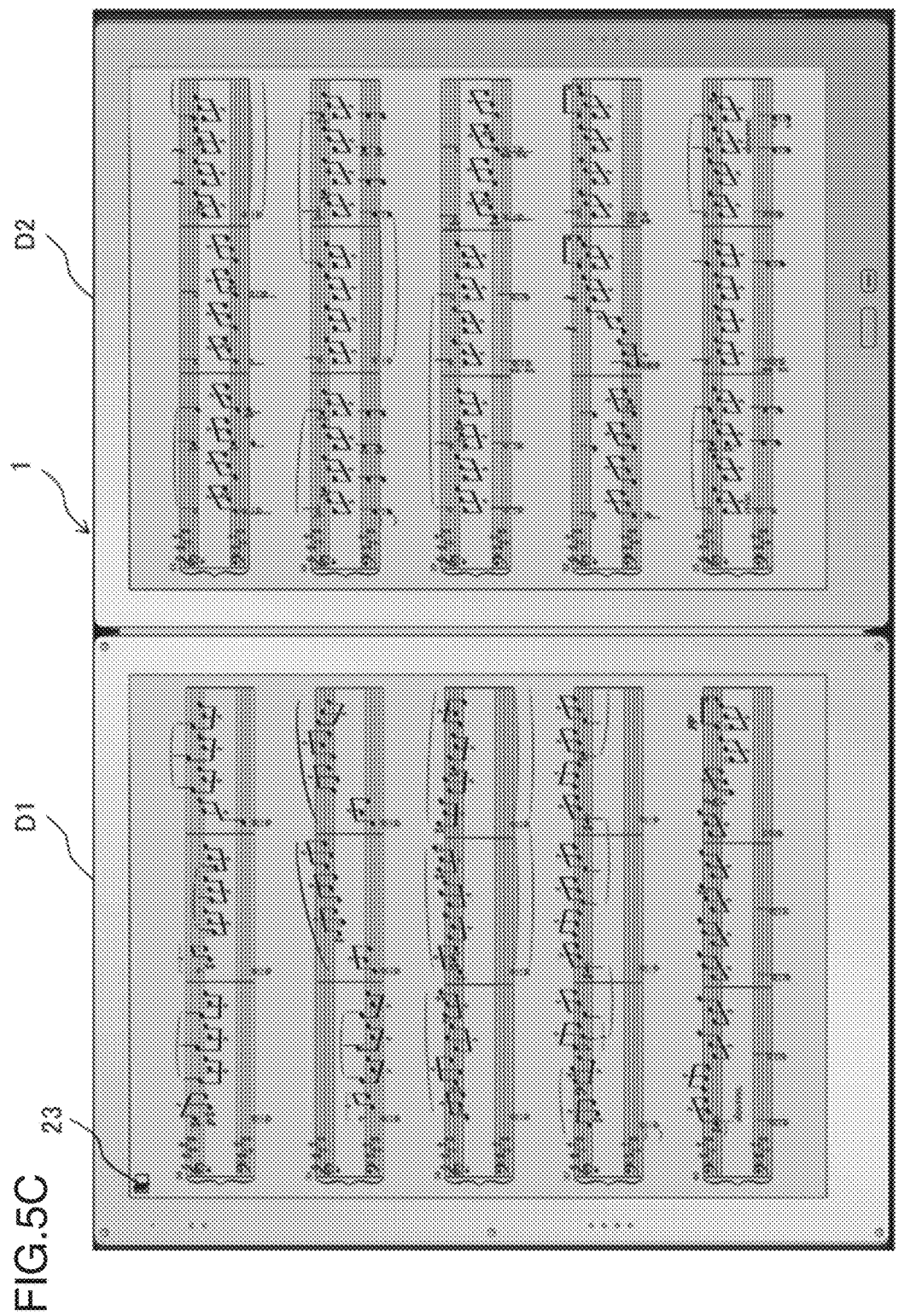
FIG. 5C is a view illustrating a screen displayed during the view-ahead, for the musical score displayed in the display portions of the electronic score apparatus in FIG. 1A.

In FIG. 5A, when a view-ahead button 22 displayed on the second display unit D2 is pressed, for example, as illustrated in FIG. 5B, the first page and the second page which are musical score pages normally displayed before the view-ahead are displayed respectively on the first and second display portions 11, 12. Next, when the page turning is performed, as illustrated in FIG. 5C, the view-ahead is executed and the third page of the musical score following the second page is displayed on the first display portion 11. In the view-ahead image display, an icon 23 indicating execution of the view-ahead image display may be displayed on the first display portion 11 as illustrated in FIG. 5C. The icon herein may be any icon as long as the user can recognize that the view-ahead is executed. When the page turning is further performed, an image of the fourth page of the musical score following the third page is displayed on the second display portion 12. In such normal image display, the icon 23 indicating execution of the view-ahead image display may be deleted on the first display portion 11. Note that the page turning may be performed by using the first and second page turning operation portions 16, 17 provided in the first and second frames 11b, 12b, buttons provided in the first and second display screens 11a, 12a, an accessory such as a pedal, an application for a smartphone, or the like.

Figure 5D:
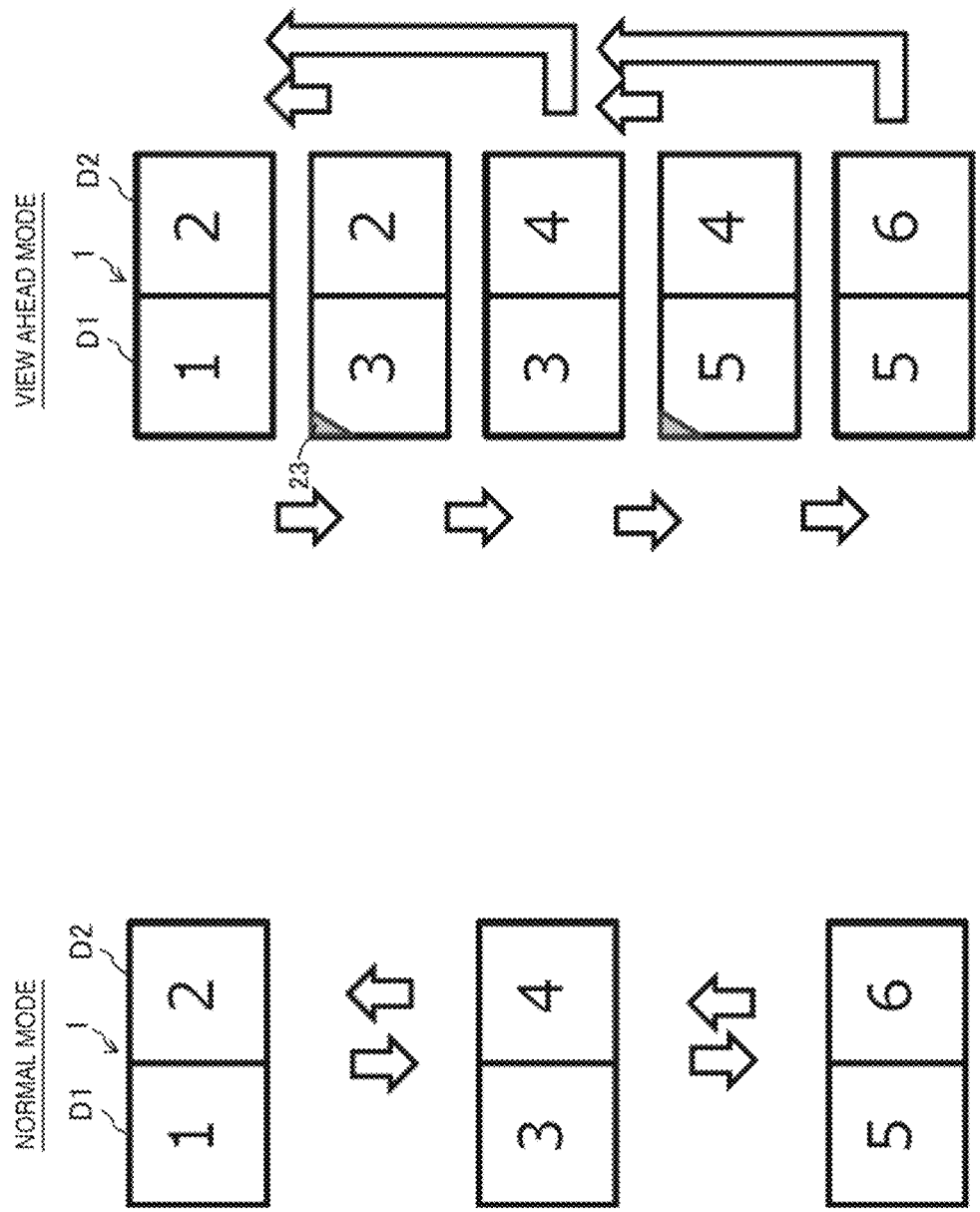
FIG. 5D is a view illustrating a comparison between a normal mode and a view-ahead mode in the page turning for the musical score displayed in the display portions of the electronic score apparatus in FIG. 1A.

FIG. 5D illustrates a comparison between a normal mode and a view-ahead mode in the page turning for the musical score displayed on the first and second display portions 11, 12 of the first and second display units D1, D2 of the electronic musical score apparatus 1. In the normal mode, when the first and second pages are displayed and the page turning is performed to proceed to the page subsequent to the first and second pages, the third and fourth pages are displayed. Then, when the page turning is performed to return to the page prior to the third and fourth pages, the first and second pages are displayed. Meanwhile, in the view-ahead mode, when the first and second pages are displayed and the page turning is performed to proceed to the page subsequent to the first and second pages, the third and second pages are displayed and, when further page turning is performed, the third and fourth pages are displayed. Moreover, when the page turning is performed to return to the prior page from the state where the third and second pages are displayed, the first and second pages are displayed. When the page turning is performed to return to the prior page from the state where the third and fourth pages are displayed, the first and second pages are displayed. When the third and second pages are displayed by executing the view-ahead, the icon 23 indicating execution of the view-ahead is displayed in the third page.

Figure 6B:
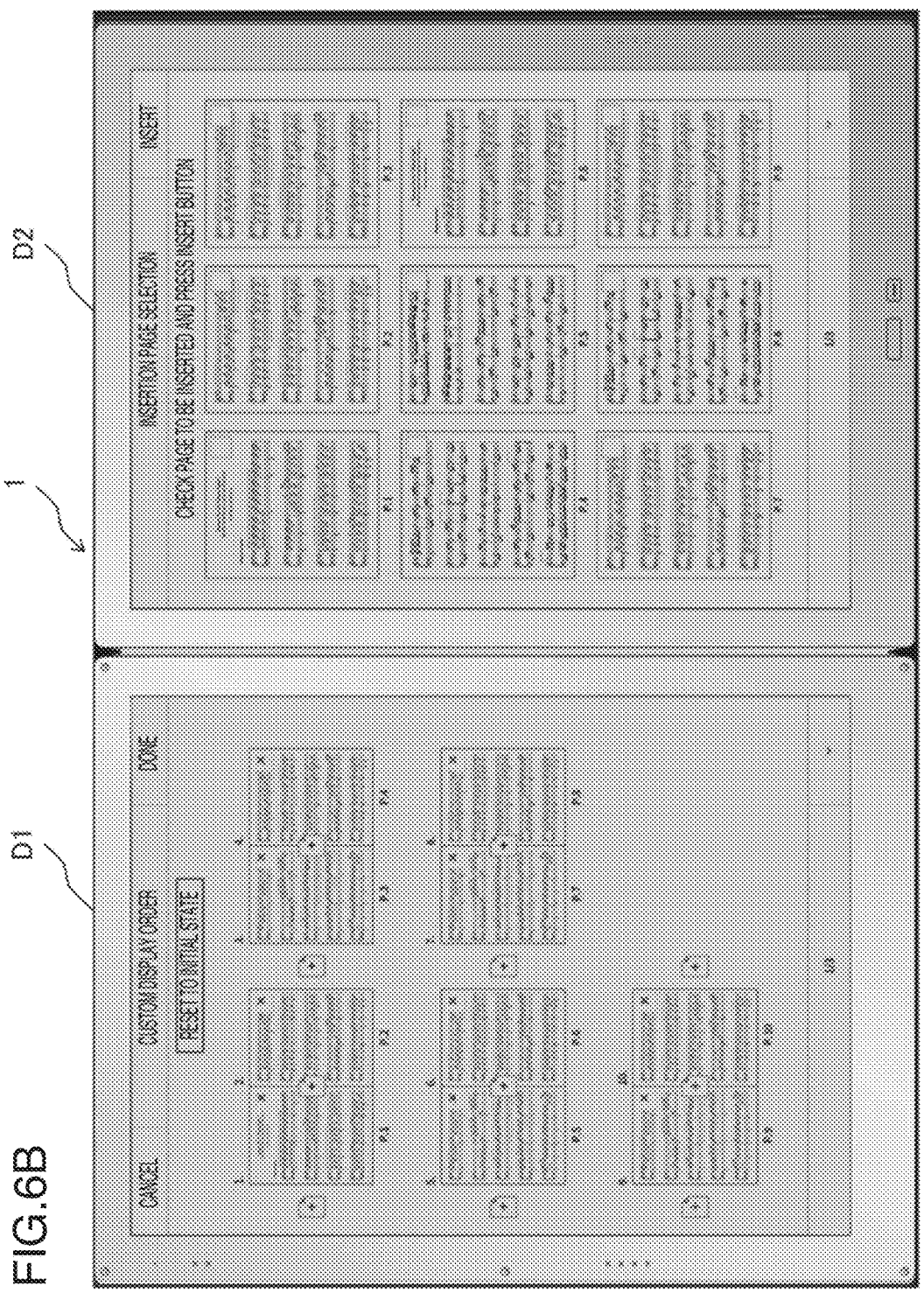
FIG. 6B is a view illustrating a screen for selecting a insertion portion and a musical score page to be inserted to set the custom display order in the page turning for the musical score displayed in the display portions of the electronic score apparatus in FIG. 1A.

FIGS. 6A to 6E illustrate a screen for setting the custom display order function in the page turning for the musical score displayed on the first and second display portions 11, 12 of the first and second display units D1, D2 of the electronic musical score apparatus 1. As illustrated in FIG. 6A, a first screen for setting the custom display order function in the page turning is displayed on the second display unit D2 by pressing the menu button 19. Incidentally, in a musical score, repeat signs for repeatedly performing part of the musical score are sometimes used. In order to perform the part repeatedly, a performer has to return to a certain page such that the repeated part is displayed, and this is troublesome for the performer. In order to avoid the trouble of such page returning indicated by the repeat signs, for a musical score including multiple pages, at least one of the multiple pages can be inserted between two adjacent pages or before and/or after one of the multiple pages by using the custom display order function.

Figure 6C:
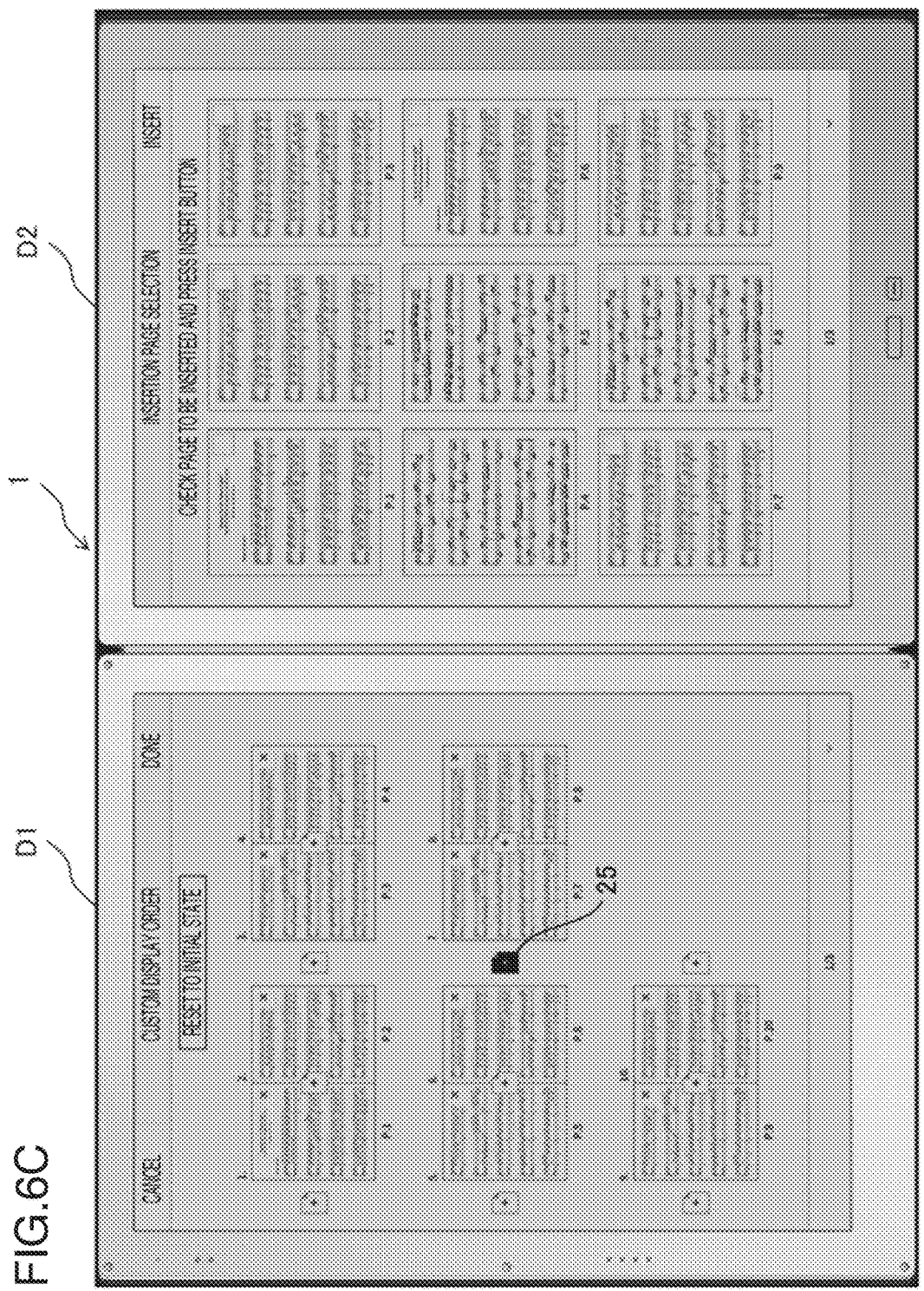
FIG. 6C is a view illustrating a screen in which the insertion portion is selected to set the custom display order in the page turning for the musical score displayed in the display portions of the electronic score apparatus in FIG. 1A.
Figure 6D:
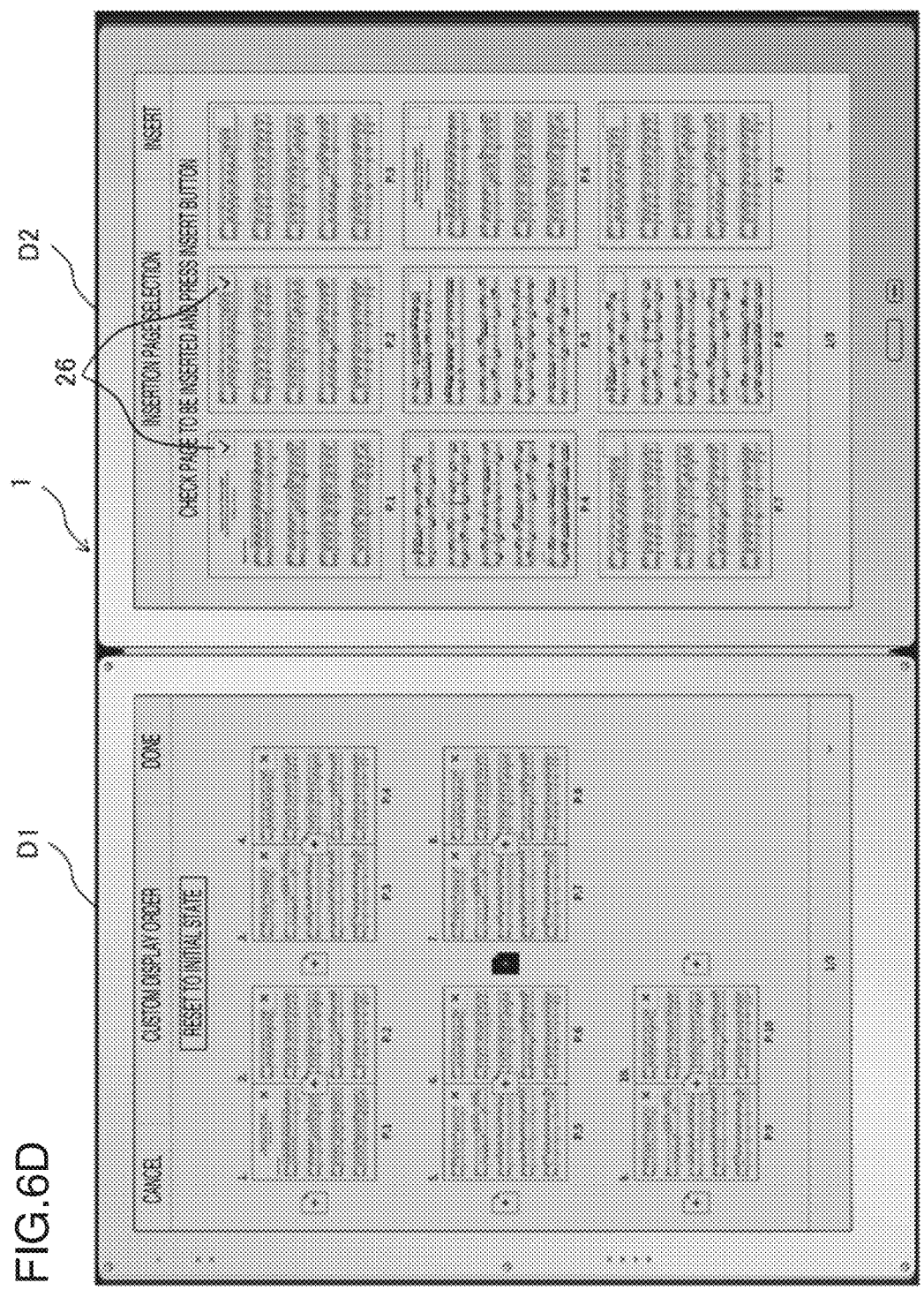
FIG. 6D is a view illustrating a screen in which the musical score pages to be inserted are selected to set the custom display order in the page turning for the musical score displayed in the display portions of the electronic score apparatus in FIG. 1A.
Figure 6E:
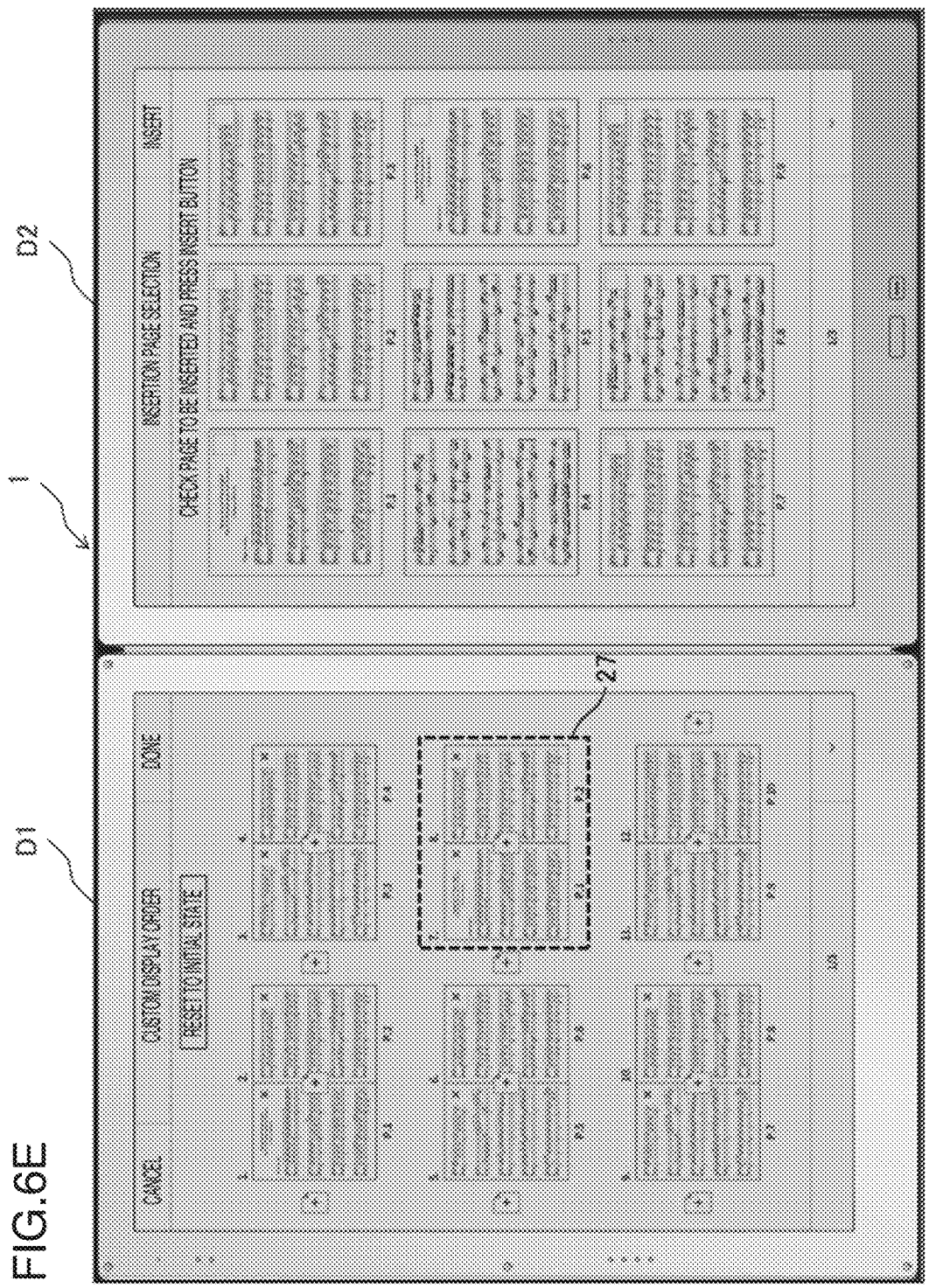
FIG. 6E is a view illustrating a screen in which the selected musical score pages are inserted in the selected insertion portion to set the custom display order in the page turning for the musical score displayed in the display portions of the electronic score apparatus in FIG. 1A.

In FIG. 6A, when a custom button 24 displayed on the second display unit D2 is pressed, as illustrated in FIG. 6B, the electronic musical score apparatus 1 displays a screen for setting the custom display order in the page turning which is used to set an insertion portion and a musical score page to be inserted for the musical score displayed on the first and second display portions 11, 12, and the user can select the insertion portion and the musical score page to be inserted. For example, when the user desires to insert a musical score page between the sixth page and the seventh page, as illustrated in FIG. 6C, the user can select and press a page insertion button 25 between the sixth page and the seventh page. The display color of the page insertion button 25 may be changed from that of the other page insertion buttons so that the user can recognize the pressing of the page insertion button 25. Then, when the user desires to insert the first page and the second page, as illustrated in FIG. 6D, the user can select and press page selection buttons 26 of the first page and the second page. A check mark may be displayed in each of the pressed page selection buttons 26 unlike in the other page selection buttons so that the user can recognize the pressing of the page selection buttons 26. As illustrated in FIG. 6E, by selecting the insertion portion and the musical score page to be inserted as described above, the first and second pages can be inserted between the sixth and seventh pages as inserted musical score pages 27 in the musical score displayed in the first and second display portions 11, 12. When the page turning is actually performed, the pages are displayed in the order of the sixth page, the first page, the second page, and the seventh page.

Figure 7B:
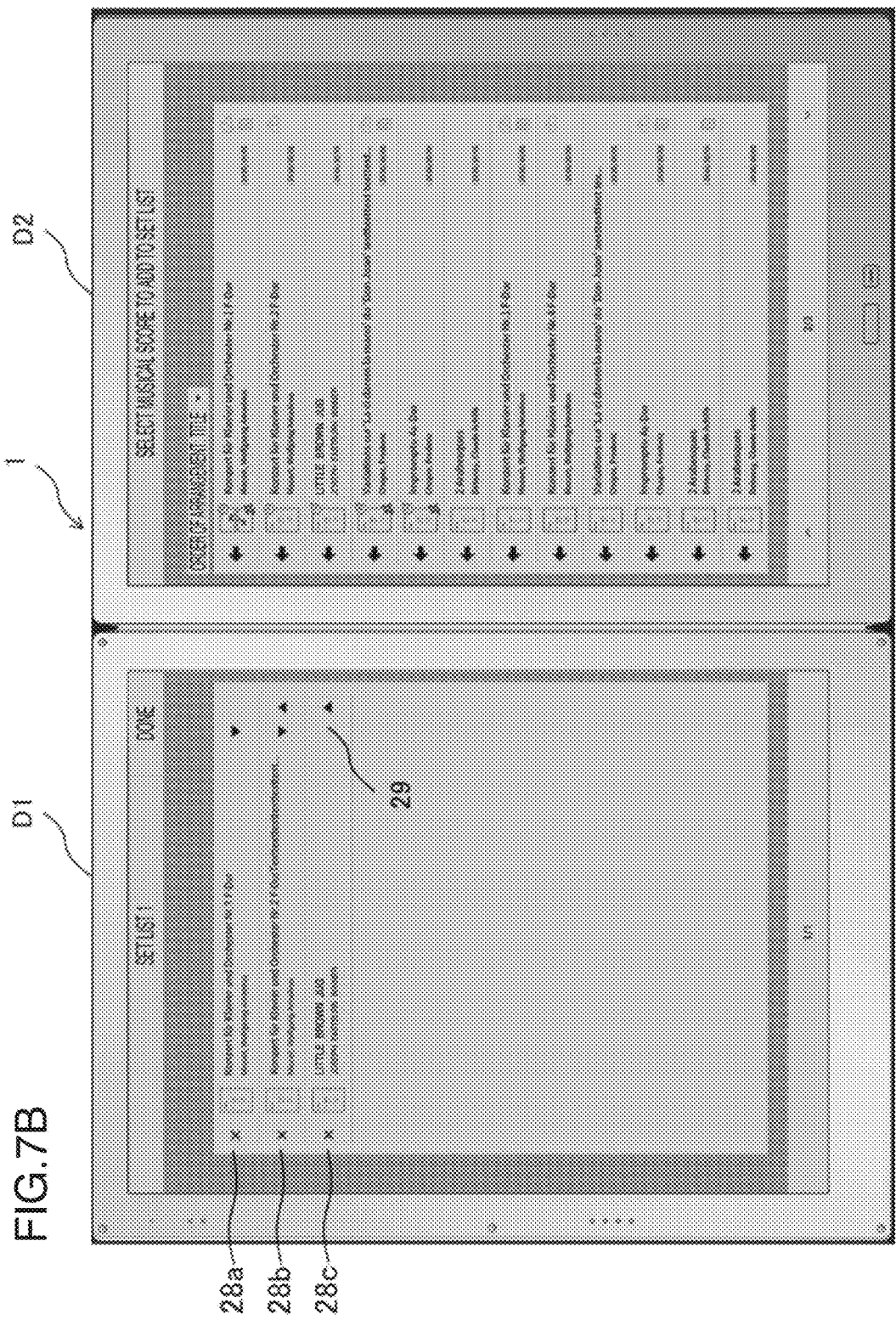
FIG. 7B is a view illustrating a screen of the set of musical pieces selected in the order of performance from the multiple musical pieces stored in the electronic musical score apparatus in FIG. 1A.

FIGS. 7A and 7B illustrate a screen for creating a set of musical pieces to be displayed on the first and second display portions 11, 12 of the first and second display units D1, D2 in the order of performance, the musical pieces selected from multiple musical pieces stored in the electronic musical score apparatus 1. As illustrated in FIG. 7A, the user displays the HOME page by using the home button 18 and then presses a new set list creation button in the HOME page to display a first screen for creating the set of musical pieces to be displayed in the order of performance which are selected from the multiple musical pieces stored in the electronic musical score apparatus 1. As illustrated in FIG. 7A, the multiple musical pieces stored in the electronic musical score apparatus 1 are displayed on the second display portion 12 and, as illustrated in FIG. 7B, three musical pieces 28a to 28c to be performed can be selected from the multiple musical pieces stored in the electronic musical score apparatus 1 in the order of performance to create the set of musical pieces. Moreover, the order of the selected musical pieces can be changed by using an order changing button 29. For example, when the musical piece 28b is to be performed after the musical piece 28c, the order can be changed such that the musical score of the musical piece 28b is displayed after the musical score of the musical piece 28c by pressing ▼ associated with the musical piece 28b.

As described above, the electronic musical score apparatus 1 can store the musical score data of the multiple musical pieces and also store at least two musical pieces selected from the multiple musical pieces as one set with the at least two musical pieces arranged in the order of performance. Moreover, when the image of the musical score data of one musical piece in the set is displayed on the first and second display portions 11, 12, the electronic musical score apparatus 1 can perform music interval display on the first and second display portions 11, 12 after reaching the last page of the one musical piece by page turning and before displaying the next musical piece, the music interval display allowing the user to recognize the names of the one musical piece and the next musical piece.

Referring to FIG. 1A, the first and second page turning operation portions 16, 17 are provided in the first and second frames 11b, 12b of the first and second display portions 11, 12 of the first and second display units D1, D2. The first and second page turning operation portions 16, 17 may be configured by mechanical or electrical switches such as electrostatic capacitive switches or mechanical electrical contact switches or may be configured by infrared (IR) LEDs and IR proximity sensors. The IR LEDs emit infrared rays and the IR proximity sensors detect the infrared rays reflected on a target object. This configuration can provide a detection distance longer than that of the electrostatic capacitive switches and improve the operability of the page turning. Moreover, using independent high-output IR LEDs can achieve extension of the detection distance and reduction of power consumption and enables optimization of the response range and distance to the target object by adjusting the arrangement and distance between the IR LEDs and the IR proximity sensors. Furthermore, an infrared transmitting white film may be employed to prevent reflection of an internal structure on a lens while taking in consideration of the external appearance and to also block interfering visible light from the outside.

It should be further understood by those skilled in the art that although the foregoing description has been made on embodiments of the present invention, the present invention is not limited thereto and various changes and modifications may be made without departing from the spirit of the present invention and the scope of the appended claims.

The invention claimed is:

1. An electronic musical score apparatus comprising at least two display units connected to each other to be openable and closeable, wherein
   the at least two display units includes:
      a memory configured to store musical score page data and an application program;
      display portions provided respectively in the at least two display units, the display portions configured to display images based on the musical score page data and allow a user to make a writing on the display portions;
      a controller configured to control image display in the display portions of the display units; and
      a communication portion configured to perform data communication with an external apparatus based on the application program in response to an instruction from the controller,
   the electronic musical score apparatus is configured to convert the writing made by the user into first annotation data, associated with the musical score page data but being manageable separately from the musical score page data, and cause of the first annotation data to be stored,
   the electronic musical score apparatus is also configured to convert a writing by the user into second annotation data, different from the first annotation data, associated with the musical score page data but being manageable separately from the musical score page data and the first annotation data, and
   when the electronic musical score apparatus displays an image of the associated musical score page data together with an image of the first or second annotation data on the display portions and then the user rewrites the first or second annotation data, the electronic musical score apparatus is configured to provide a write history for the first or second annotation data by causing the first or second annotation data before the rewriting to be stored as first-generation first or second annotation data and causing the first or second annotation data after the rewriting to be stored as second-generation first or second annotation data, respectively.

2. The electronic musical score apparatus according to claim 1, wherein the electronic musical score apparatus displays the image of the associated musical score page data on the display portions together with one of the first-generation and second-generation first annotation data.

3. The electronic musical score apparatus according to claim 1, wherein the electronic musical score apparatus is configured to send the musical score page data and the first-generation and second-generation first annotation data to the external apparatus via the communication portion to cause the musical score page data and the first-generation and second-generation first annotation data to be stored in the external apparatus.

4. The electronic musical score apparatus according to claim 3, wherein only the second-generation first annotation data out of the first-generation and second-generation first annotation data is stored.

5. The electronic musical score apparatus according to claim 4, wherein the electronic musical score apparatus receives the first-generation first annotation data stored in the external apparatus via the communication portion and displays an image of the first-generation first annotation data on the display portions.

6. The electronic musical score apparatus according to claim 1, wherein
   a second electronic musical score apparatus other than the electronic musical score apparatus according to claim 1 is connectable to the external apparatus,
   when the second electronic musical score apparatus receives one of the first-generation and second-generation first annotation data stored in the external apparatus and displays an image of the received data and a user of the second electronic musical score apparatus makes a writing, the second electronic musical score apparatus provides a further history by storing the writing made by the user of the second electronic musical score apparatus in the external apparatus as third-generation annotation data for the first annotation data, and
   the electronic musical score apparatus receives the third-generation first annotation data stored in the external apparatus via the communication portion and displays an image of the third-generation first annotation data on the display portions.

7. The electronic musical score apparatus according to claim 6, wherein a writing made by the user of the second electronic musical score apparatus is stored in the external apparatus as third annotation data different from the first annotation data and the electronic musical score apparatus receives the third annotation data stored in the external apparatus via the communication portion and displays an image of the third annotation data on the display portions.

8. The electronic musical score apparatus according to claim 1, wherein
   after a performance for a page of a musical score displayed on one of the display portions of the at least two display units is completed, the electronic musical score apparatus performs view-ahead image display in which the page of the musical score displayed on the one display portion is switched to a page subsequent to a page of the musical score displayed on the other display portion for which a performance is being made, and simultaneously displays an icon indicating execution of the view-ahead image display, and while the performance is being made for the page of the musical score displayed on the one display portion in the view-ahead image display, the electronic musical score apparatus deletes the icon.

9. The electronic musical score apparatus according to claim 1, wherein for the musical score page data including a plurality of pages, the electronic musical score apparatus is configured to insert at least one of the plurality of pages before and/or after one of the plurality of pages.

10. The electronic musical score apparatus according to claim 1, wherein the electronic musical score apparatus is configured to cause musical score data of a plurality of musical pieces to be stored and cause of at least two musical pieces selected from the plurality of musical pieces to be stored as one set with the selected musical pieces arranged in the order of performance, and when an image of the musical score data of one musical piece in the set is displayed on the display portions, the electronic musical score apparatus performs music interval display after reaching a last page of the one musical piece by page turning and before displaying a musical piece following the one musical piece, the music interval display allowing the user to recognize names of the one musical piece and the following musical piece.

11. The electronic musical score apparatus according to claim 1, further comprising a page turning operation portion used to return from a page displayed on each of the display portions based on the musical score data to a previous page and display the previous page and to proceed from the displayed page to a subsequent page and display the subsequent page, wherein the page turning operation portion includes an IR LED and an IR sensor.

12. An electronic musical score apparatus comprising at least two display units connected to each other to be openable and closeable, wherein the at least two display units includes:

a memory configured to store musical score page data and an application program;

display portions provided respectively in the at least two display units, the display portions configured to display images based on the musical score page data and allow a user to make a writing on the display portions;

a controller configured to control image display in the display portions of the display units; and a communication portion configured to perform data communication with an external apparatus based on the application program in response to an instruction from the controller, the electronic musical score apparatus is configured to convert the writing made by the user into first annotation data, associated with the musical score page data but being manageable separately from the musical score page data, and cause the first annotation data to be stored, when the electronic musical score apparatus displays an image of the associated musical score page data together with an image of the first annotation data on the display portions and then the user rewrites the first annotation data, the electronic musical score apparatus is configured to provide a write history for the first annotation data by causing the first annotation data before the rewriting to be stored as first-generation first annotation data and causing the first annotation data after the rewriting to be stored as second-generation first annotation data, the electronic musical score apparatus is configured to cause musical score data of a plurality of musical pieces to be stored and cause at least two musical pieces selected from the plurality of musical pieces to be stored as one set with the selected musical pieces arranged in the order of performance, and when an image of the musical score data of one musical piece in the set is displayed on the display portions, the electronic musical score apparatus performs music interval display after reaching a last page of the one musical piece by page turning and before displaying a musical piece following the one musical piece, the music interval display allowing the user to recognize names of the one musical piece and the following musical piece.

* * * * *